(12) United States Patent
Qamhiyeh

(10) Patent No.: US 8,056,529 B2
(45) Date of Patent: Nov. 15, 2011

(54) ROTARY INTERNAL COMBUSTION ENGINE FOR COMBUSTING LOW CETANE FUELS

(76) Inventor: Ziyad A. Qamhiyeh, Ames, IA (US)

( * ) Notice: Subject to any disclaimer, the term of this patent is extended or adjusted under 35 U.S.C. 154(b) by 281 days.

(21) Appl. No.: 12/460,499

(22) Filed: Jul. 20, 2009

(65) Prior Publication Data

US 2009/0282835 A1 Nov. 19, 2009

Related U.S. Application Data

(63) Continuation-in-part of application No. 11/827,050, filed on Jul. 10, 2007, now Pat. No. 7,637,243.

(51) Int. Cl.
*F02B 53/00* (2006.01)
*F02B 45/00* (2006.01)
*F02C 3/00* (2006.01)
*F02C 5/00* (2006.01)
*C10L 5/00* (2006.01)
*C10L 1/18* (2006.01)
*C10L 1/22* (2006.01)
*F02D 41/00* (2006.01)

(52) U.S. Cl. ............... 123/241; 123/23; 44/620; 44/364; 44/432; 44/384; 60/39.44

(58) Field of Classification Search ............... 123/241, 123/23, 27 R, 1 A, 205–206, 213, 234; 60/39.34–39.35, 39.44; 44/620, 57, 364, 44/432, 62, 382; *F02M 13/04; F02D 41/00*
See application file for complete search history.

(56) References Cited

U.S. PATENT DOCUMENTS

| | | |
|---|---|---|
| 1,068,596 A | 7/1913 | Long |
| 1,463,646 A * | 7/1923 | Chilowsky .................. 123/241 |
| 1,552,272 A | 9/1925 | Carner |
| 2,127,016 A | 8/1938 | Voiles |
| 2,622,569 A | 12/1952 | Rochefort |
| 2,783,964 A | 3/1957 | Theimer |
| 2,811,145 A * | 10/1957 | Young ........................ 123/1 A |
| 3,244,154 A * | 4/1966 | Lohner ....................... 123/205 |
| 3,259,113 A * | 7/1966 | Hamada ...................... 123/234 |
| 3,263,658 A * | 8/1966 | Bar .............................. 123/213 |
| 3,266,234 A | 8/1966 | Cook |
| 3,387,595 A * | 6/1968 | Bentele ....................... 123/206 |
| 3,486,487 A | 12/1969 | Kelly |
| 3,893,428 A * | 7/1975 | Markus ....................... 123/206 |
| 4,024,705 A * | 5/1977 | Hedrick ..................... 60/39.35 |

(Continued)

FOREIGN PATENT DOCUMENTS

EP 2 103 798 A1 * 9/2009

(Continued)

*Primary Examiner* — Thai Ba Trieu

(74) *Attorney, Agent, or Firm* — McKee, Voorhees & Sease, P.L.C.

(57) ABSTRACT

This invention presents a compact, light, efficient and high power output rotary internal combustion engine utilizing the waste heat. The engine has a rotor rotatable within a housing, but has no piston. The rotor has a plurality of combustion chambers, with inlets for introduction of fuel and outlets for exhaust of combustion products. The exhaust imparts rotation to the rotor within the housing. Fixed end caps are provided at each end of the housing. The engine is cooled with steam, air and water. The engine is suitable for applications that require efficient, high power to weight ratio, such as aircrafts, ships, and heavy duty transportation. The engine may use low grade fuel with a low cetane number, by using specially treated pulverized coal.

18 Claims, 25 Drawing Sheets

U.S. PATENT DOCUMENTS

| | | | |
|---|---|---|---|
| 4,038,948 A | | 8/1977 | Blackwood |
| 4,089,658 A | * | 5/1978 | Bay .................. 44/382 |
| 4,169,451 A | | 10/1979 | Niggemeyer |
| 4,381,745 A | * | 5/1983 | Firey ................ 123/23 |
| 4,412,511 A | * | 11/1983 | Firey ................ 123/23 |
| 4,556,020 A | * | 12/1985 | Hickling ............ 123/143 B |
| 4,653,436 A | * | 3/1987 | Firey ................ 123/23 |
| 4,653,437 A | * | 3/1987 | Firey ................ 123/23 |
| 4,678,479 A | * | 7/1987 | Holmes et al. ........ 44/432 |
| 4,784,097 A | * | 11/1988 | Ishida ............... 123/260 |
| 4,852,097 A | * | 7/1989 | Sichart et al. ........ 714/781 |
| 5,282,356 A | * | 2/1994 | Abell ................ 60/39.35 |
| 5,501,714 A | * | 3/1996 | Valentine et al. ...... 44/364 |
| 6,349,695 B1 | | 2/2002 | Lee |
| 6,418,885 B1 | | 7/2002 | Paul et al. |
| 6,694,743 B2 | * | 2/2004 | Lawlor et al. ........ 60/772 |
| 7,284,506 B1 | * | 10/2007 | Sun et al. ........... 123/1 A |
| 7,503,944 B2 | * | 3/2009 | Carroll et al. ........ 44/364 |
| 2003/0052041 A1 | * | 3/2003 | Erwin et al. ......... 208/15 |

FOREIGN PATENT DOCUMENTS

| | | | |
|---|---|---|---|
| GB | 648647 A | * | 1/1951 |
| JP | 09158731 A | * | 6/1997 |
| JP | 2002071137 A | * | 3/2002 |
| RU | 2289698 C2 | | 12/2006 |
| WO | WO 9721915 A1 | * | 6/1997 |
| WO | WO 9825012 A1 | * | 6/1998 |

\* cited by examiner

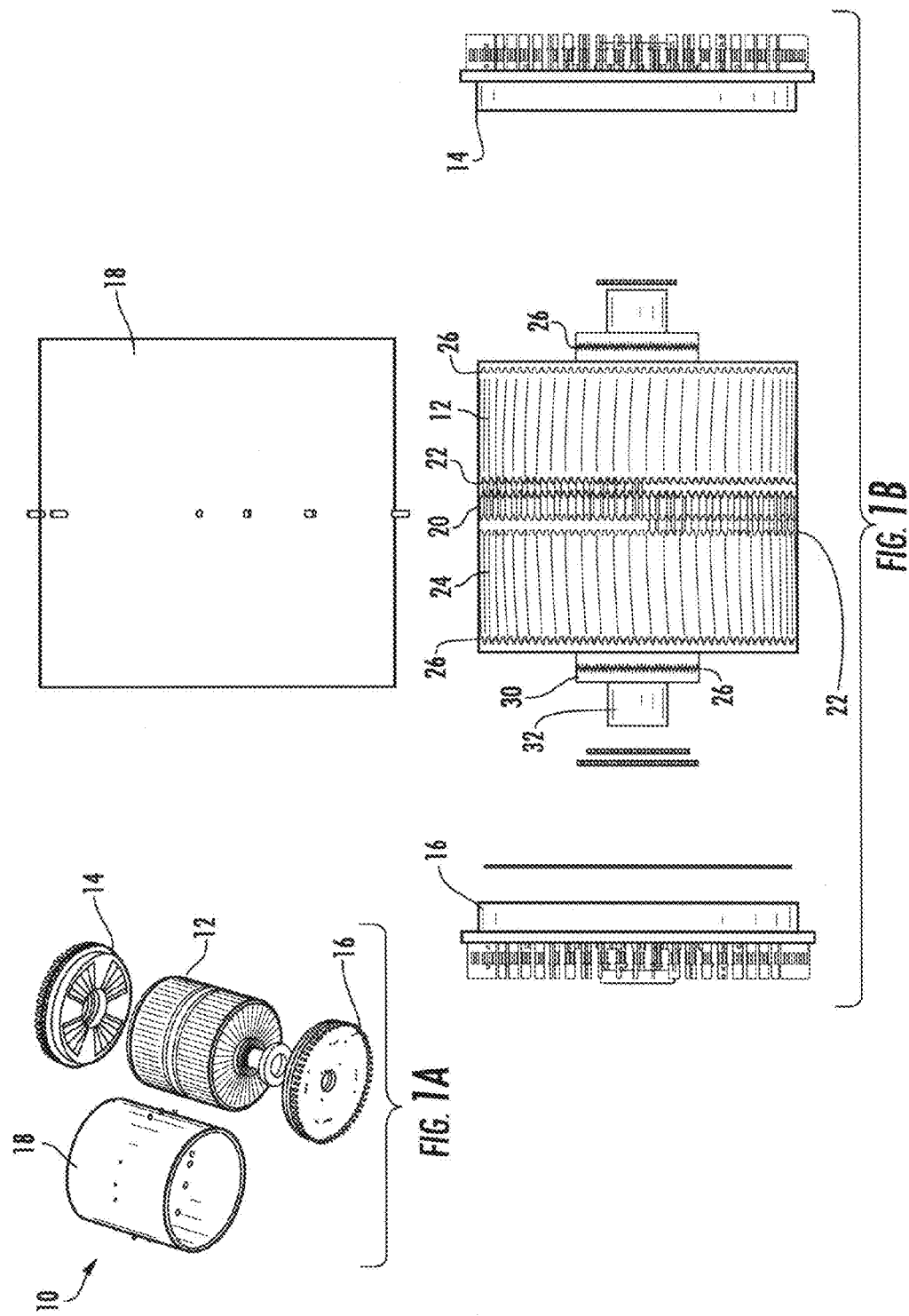

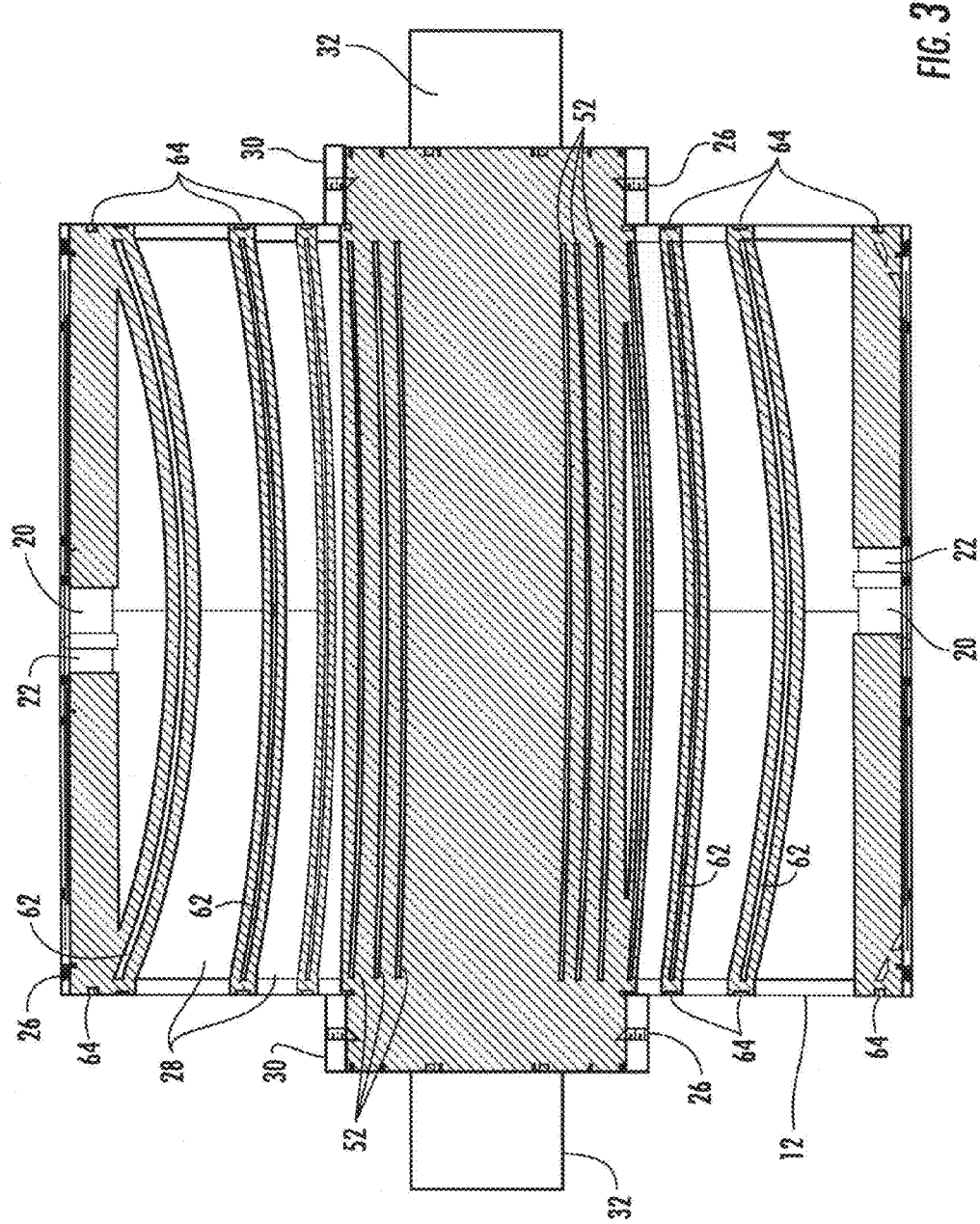

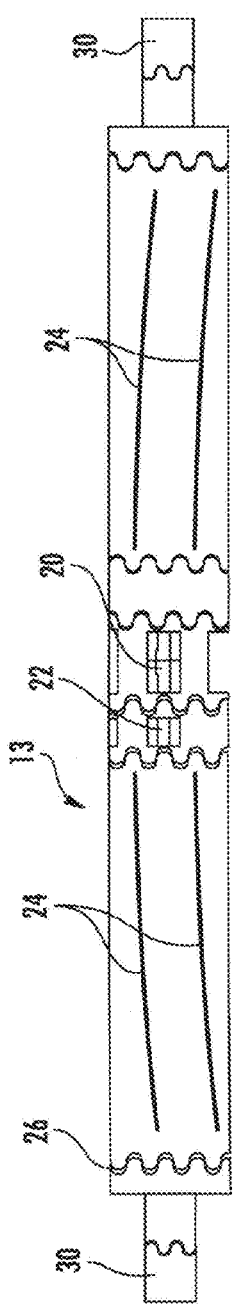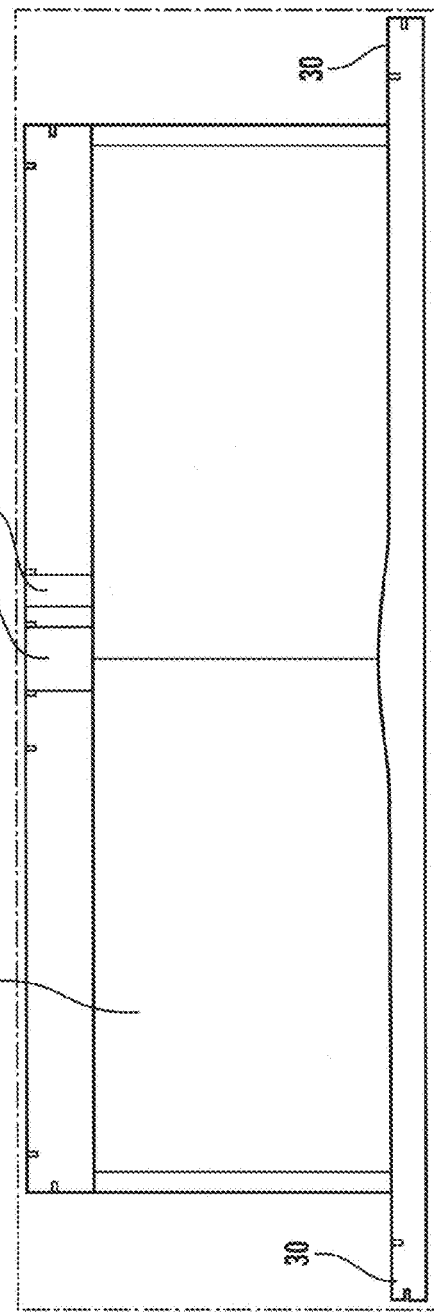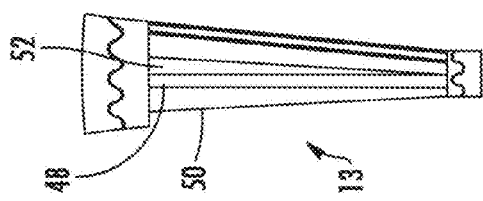

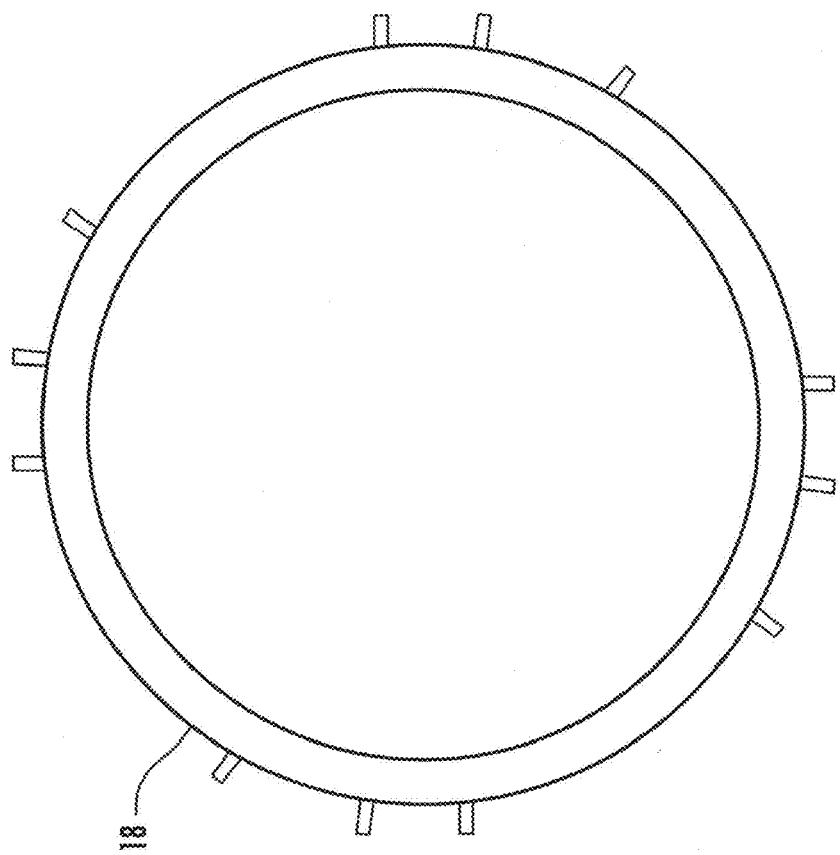

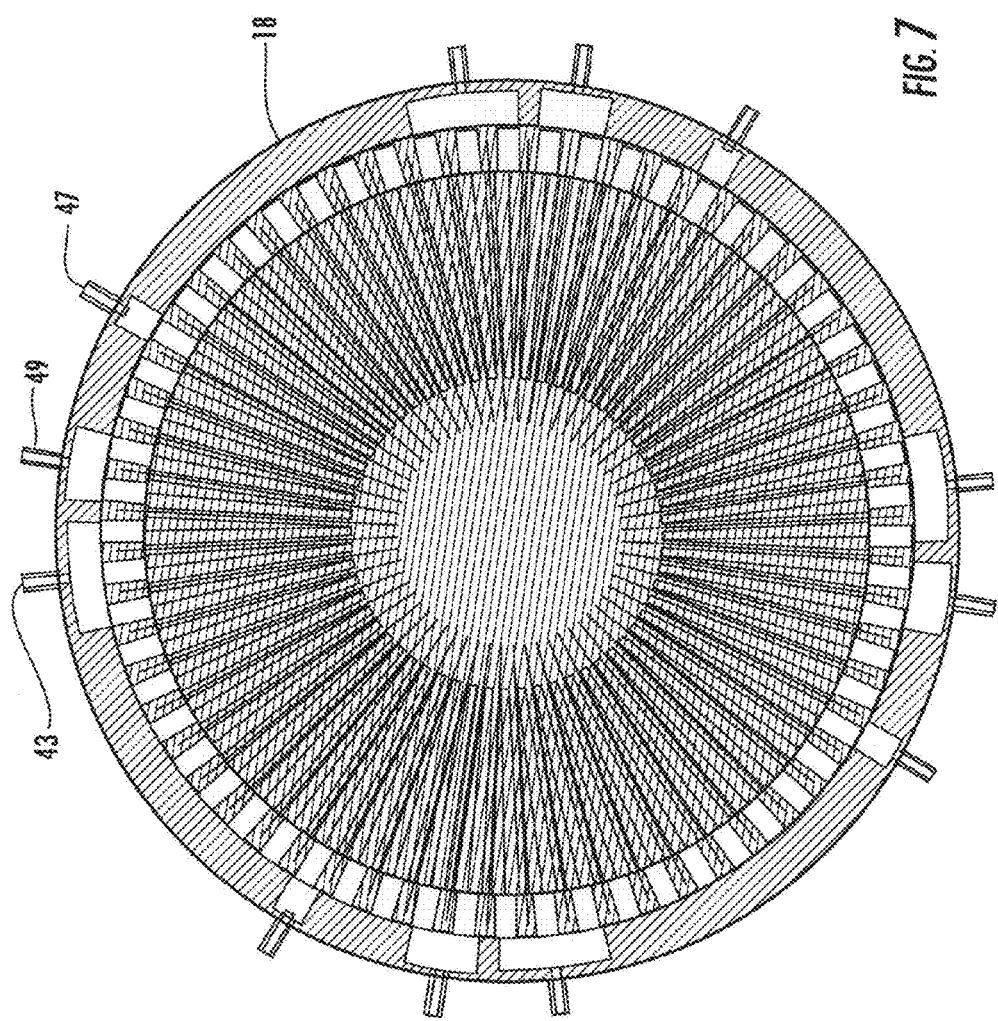

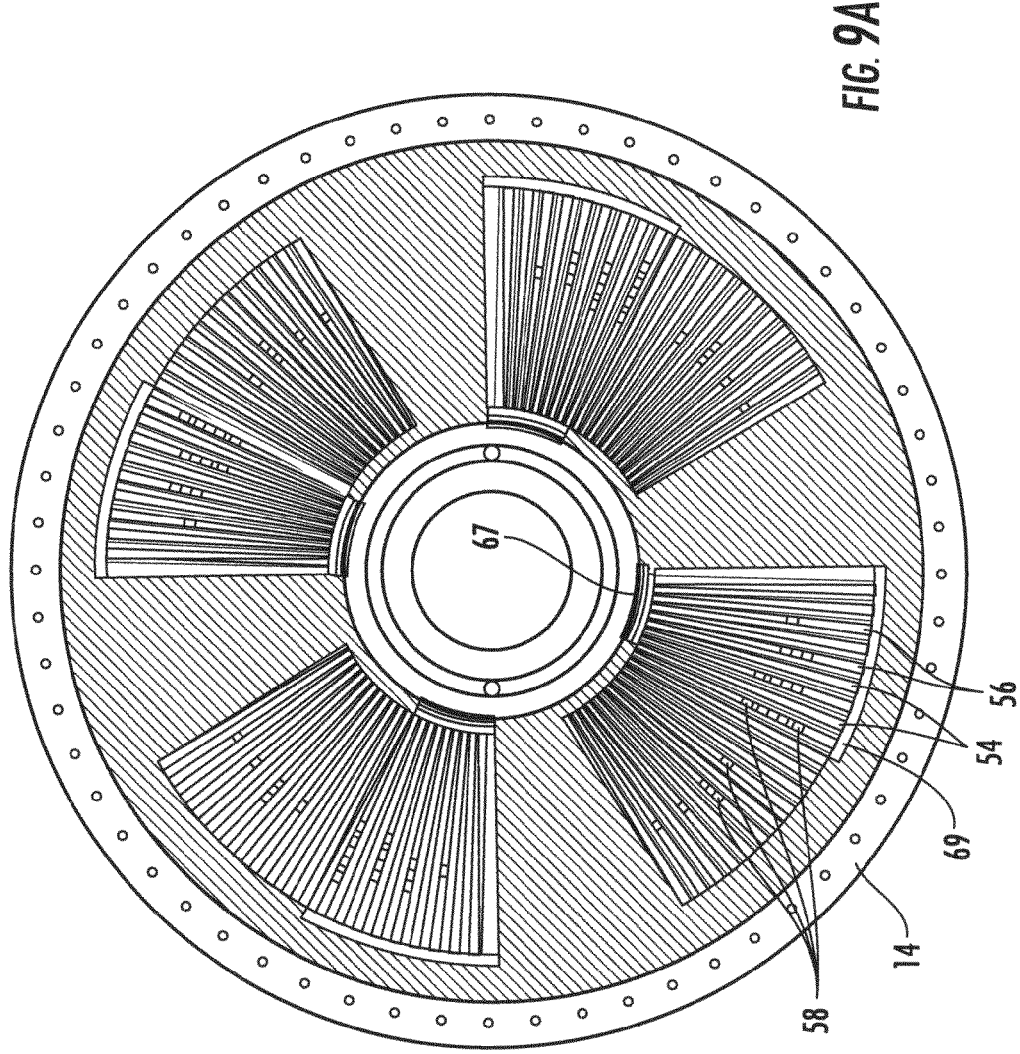

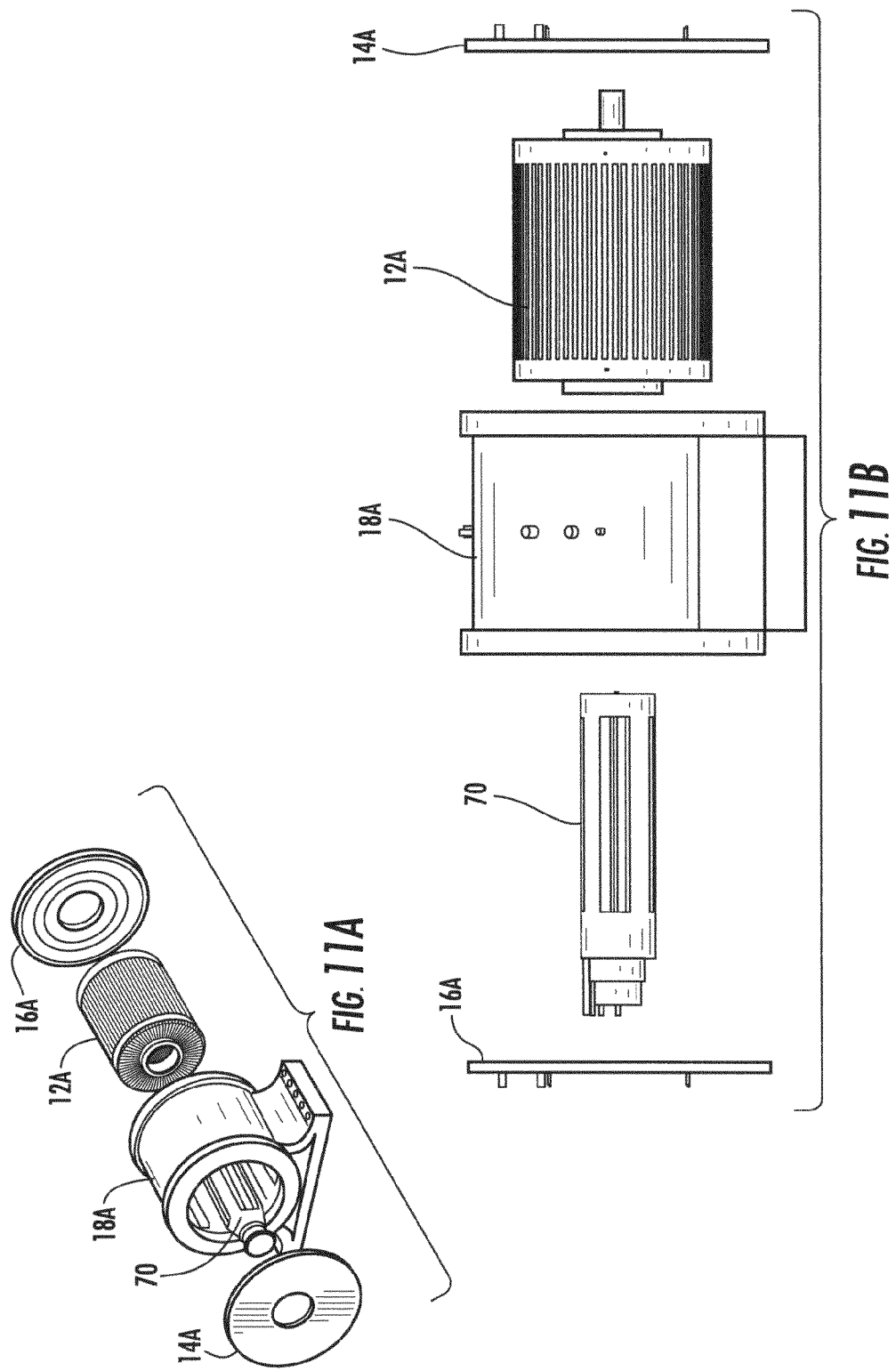

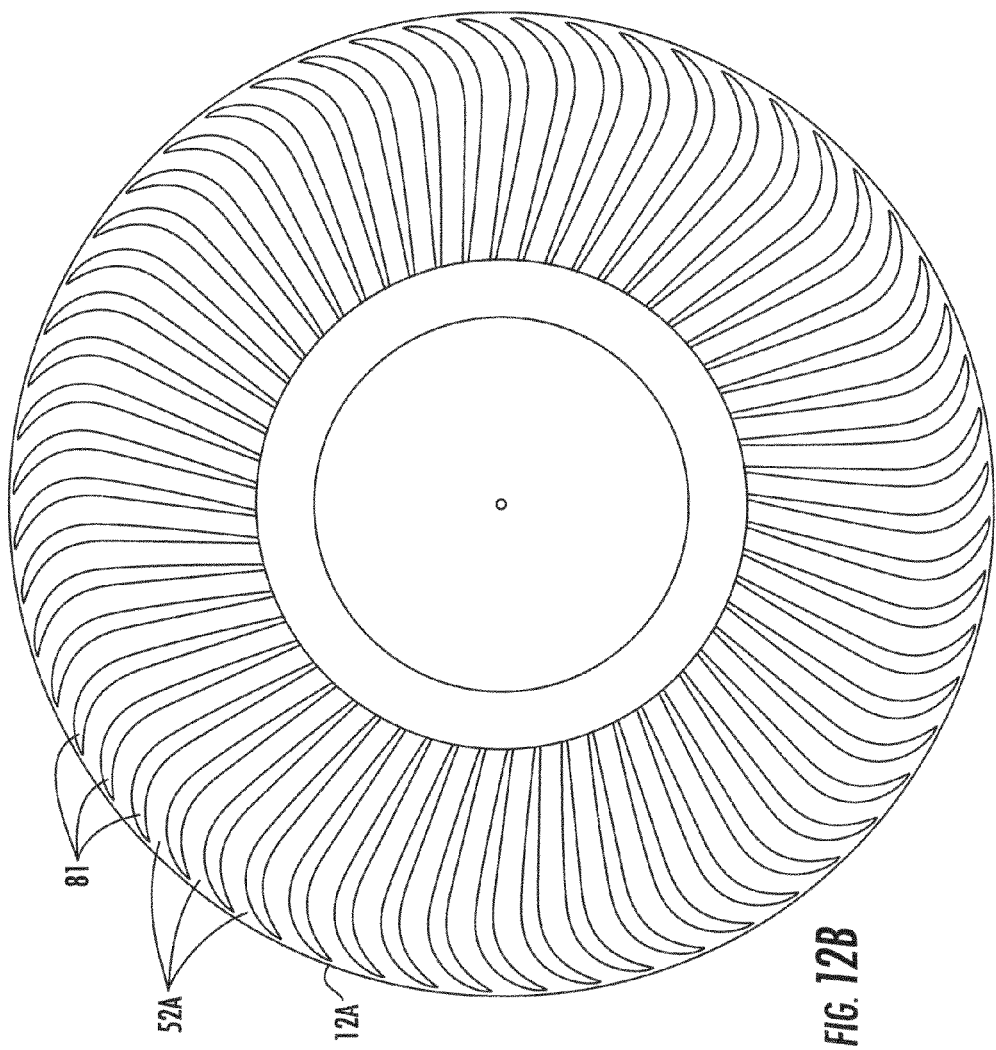
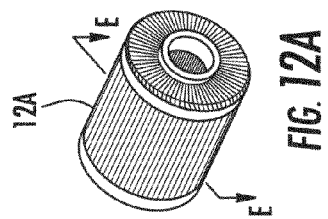
FIG. 12A
FIG. 12B

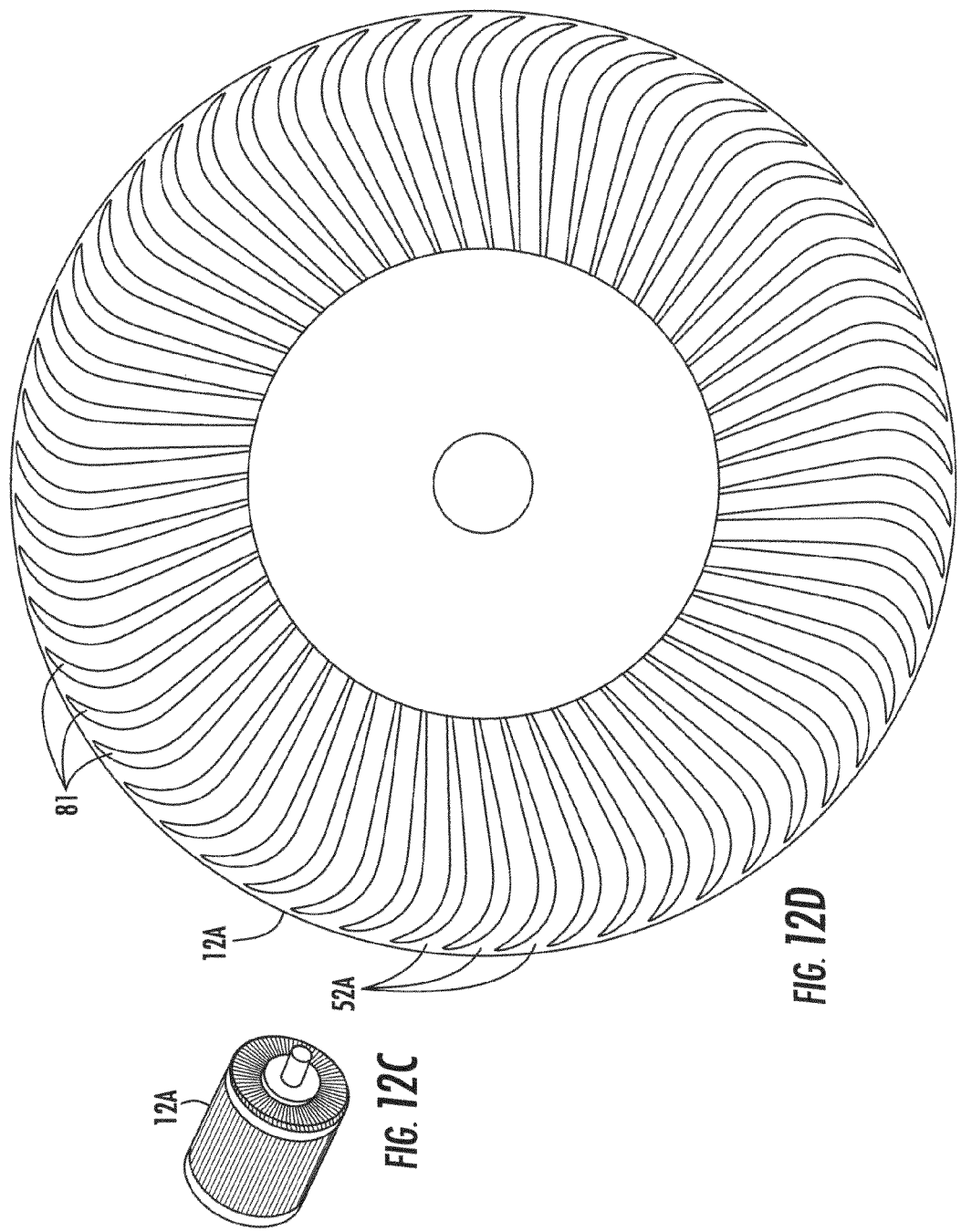

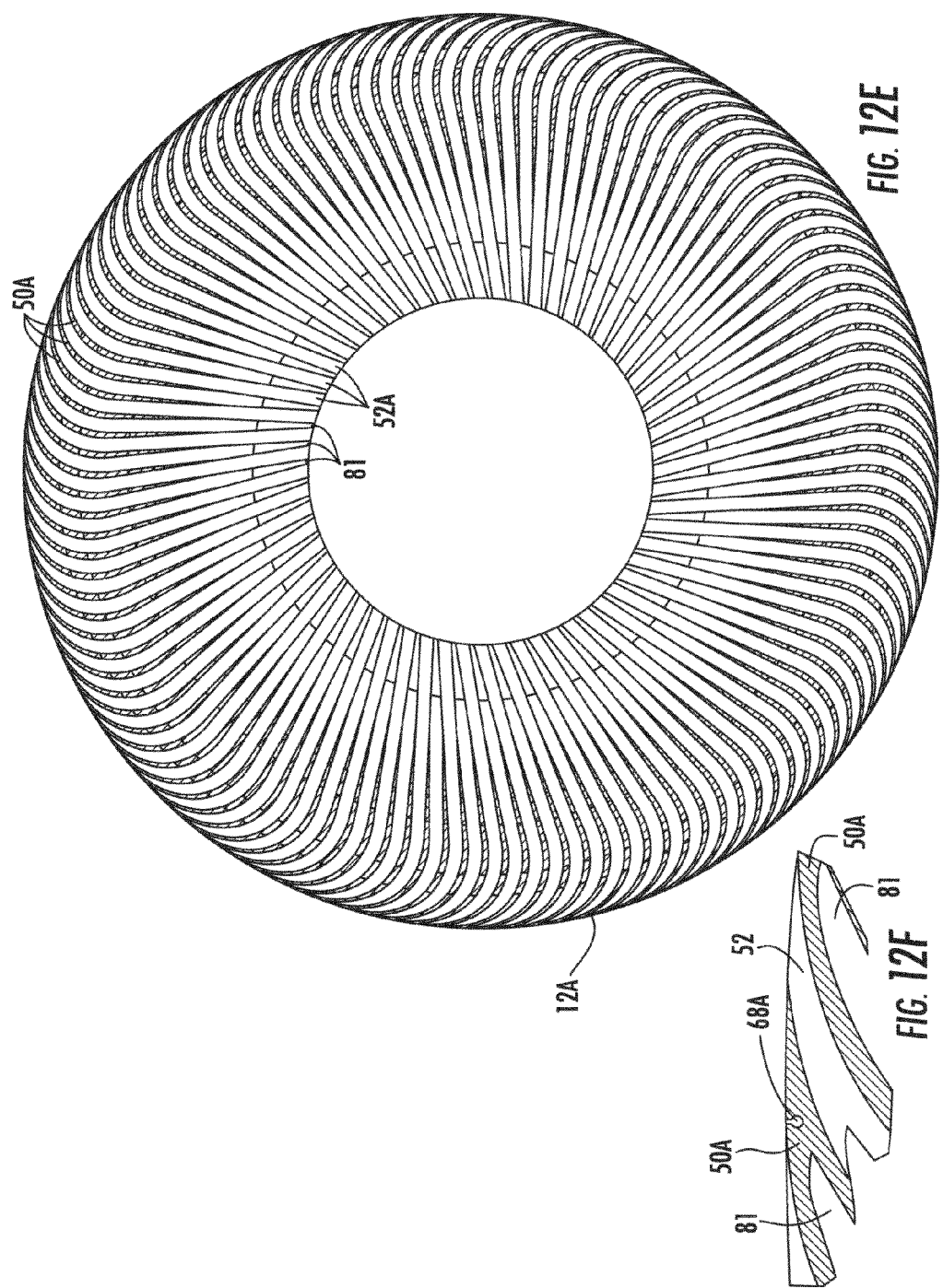

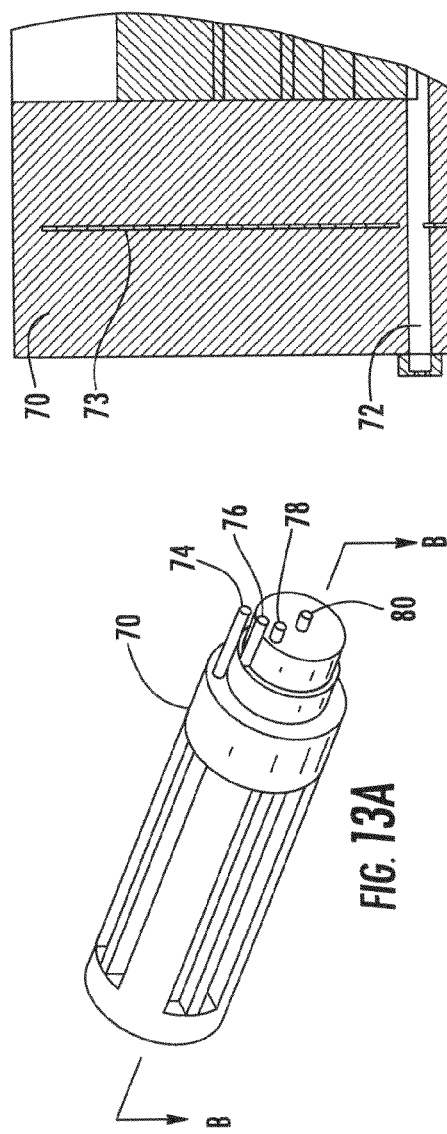
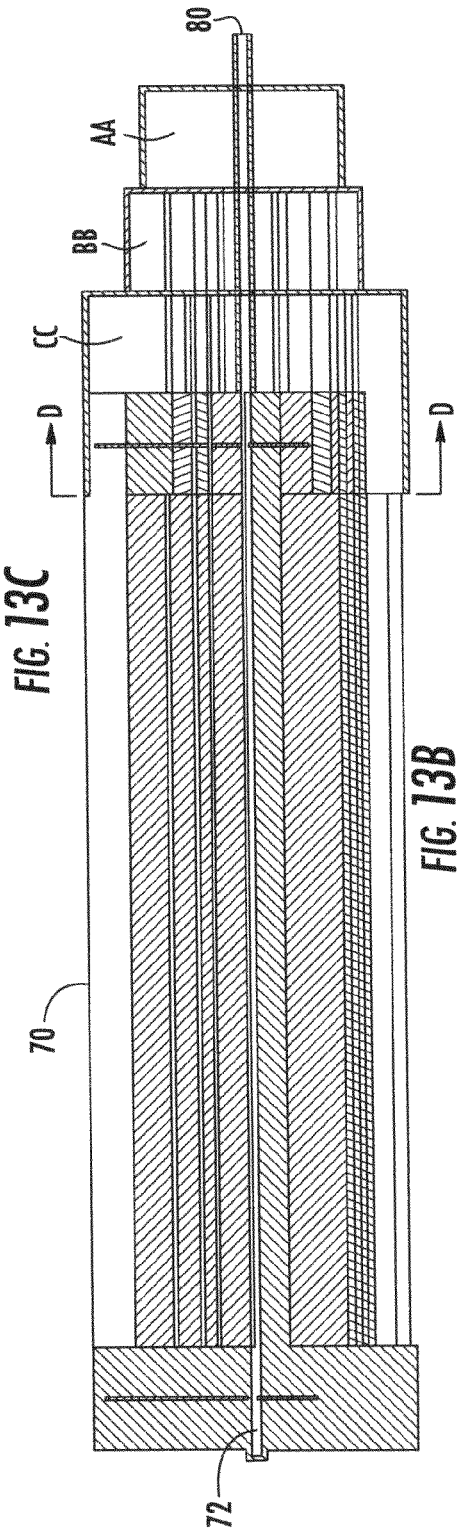
FIG. 13A
FIG. 13C
FIG. 13B

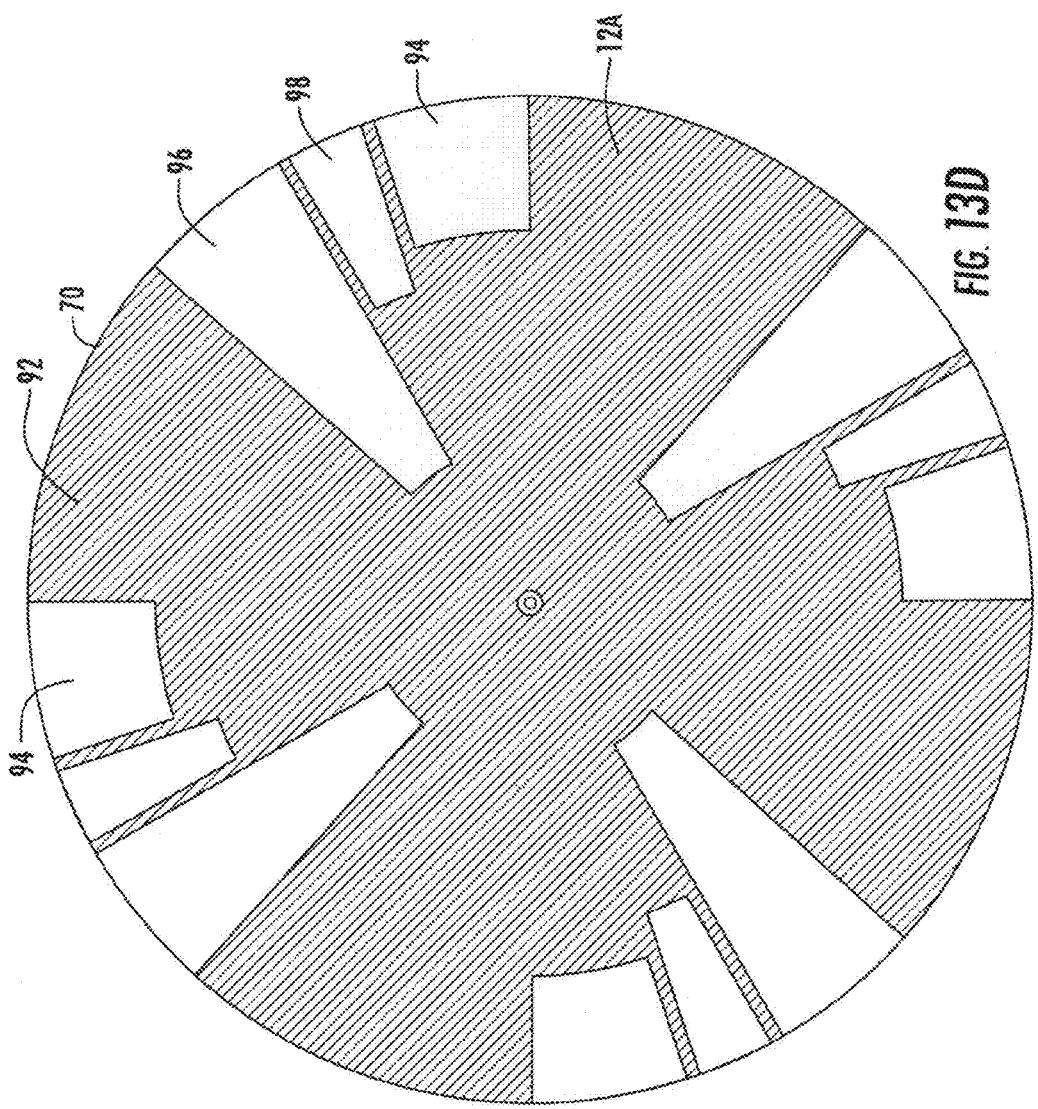

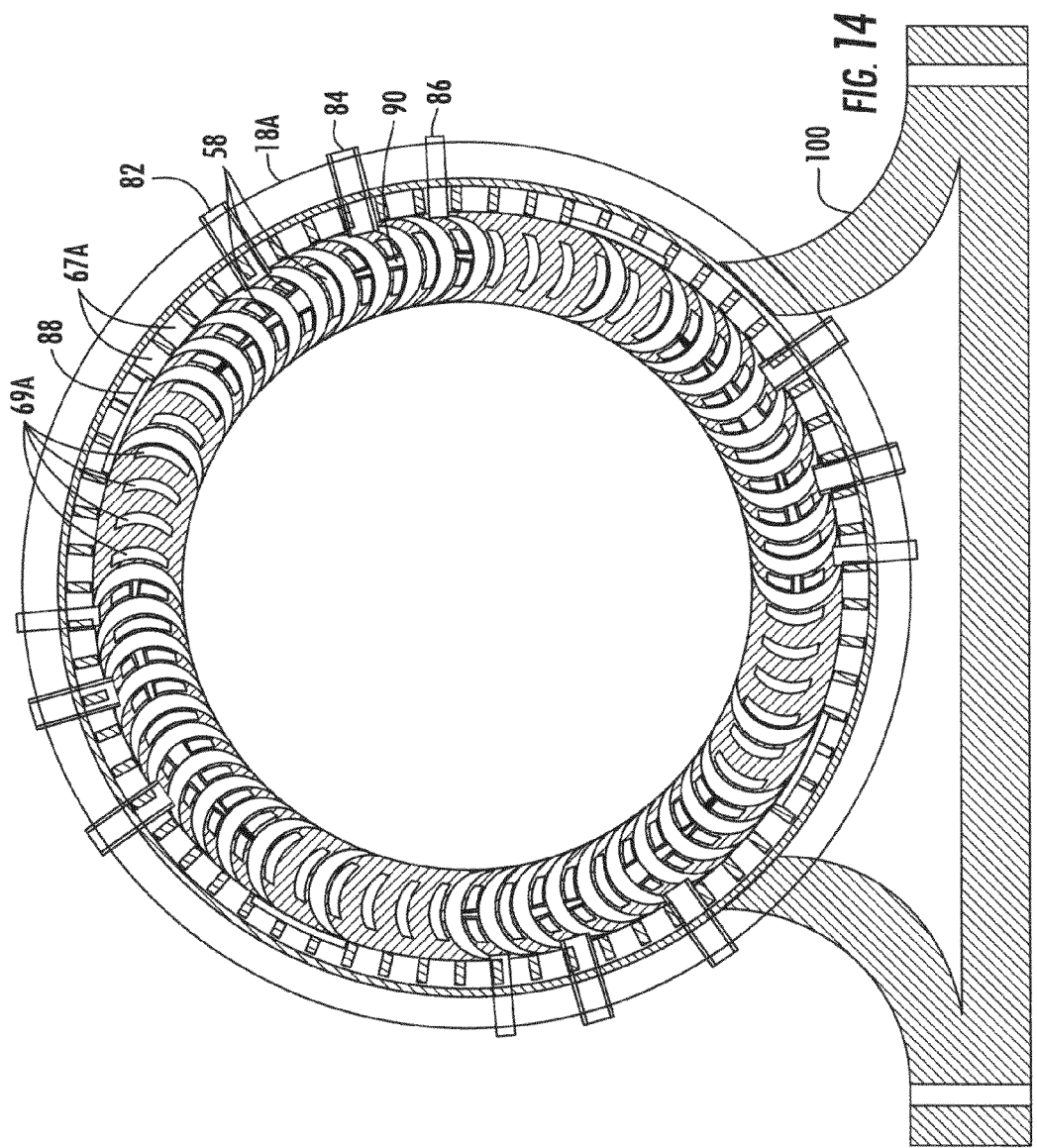

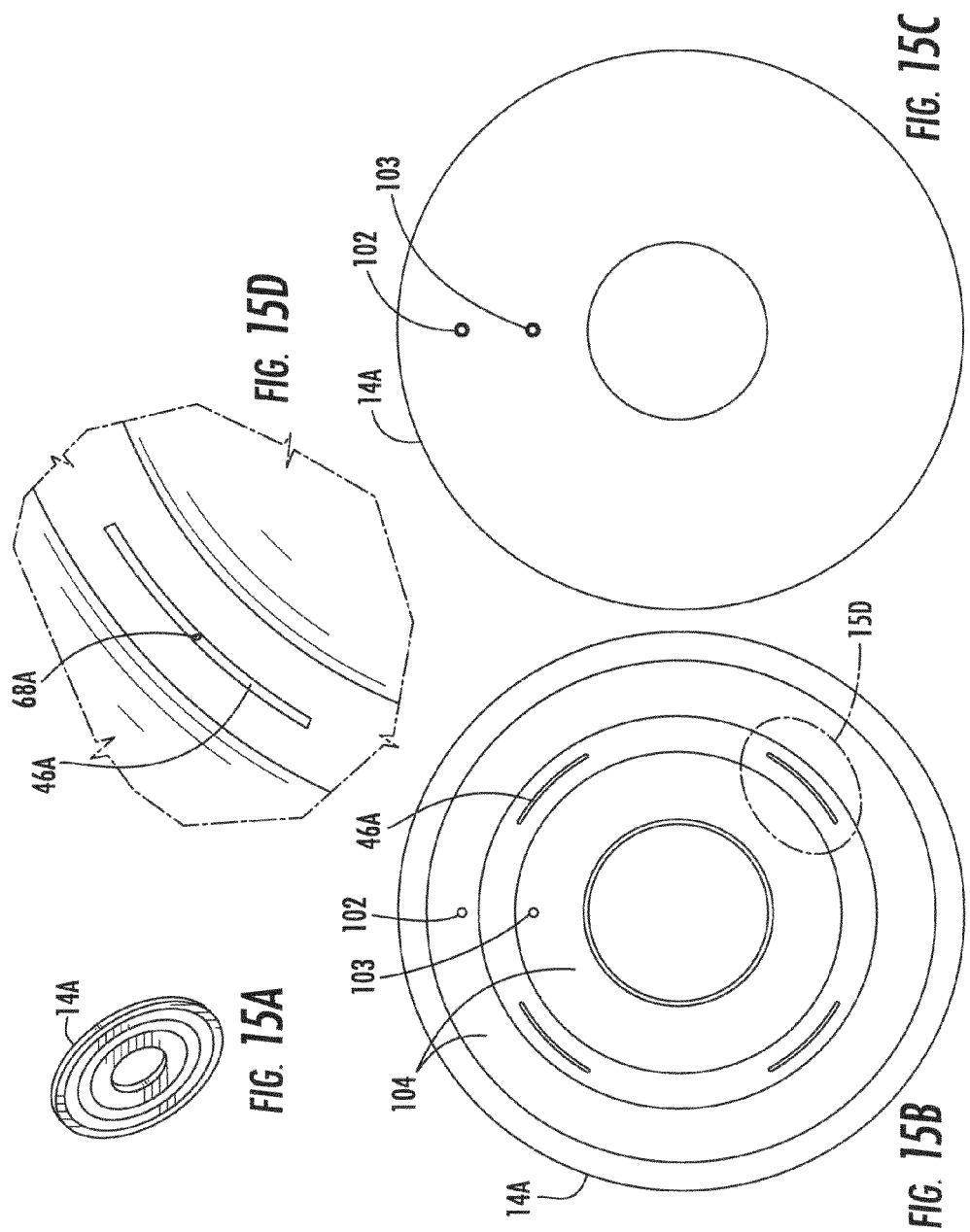

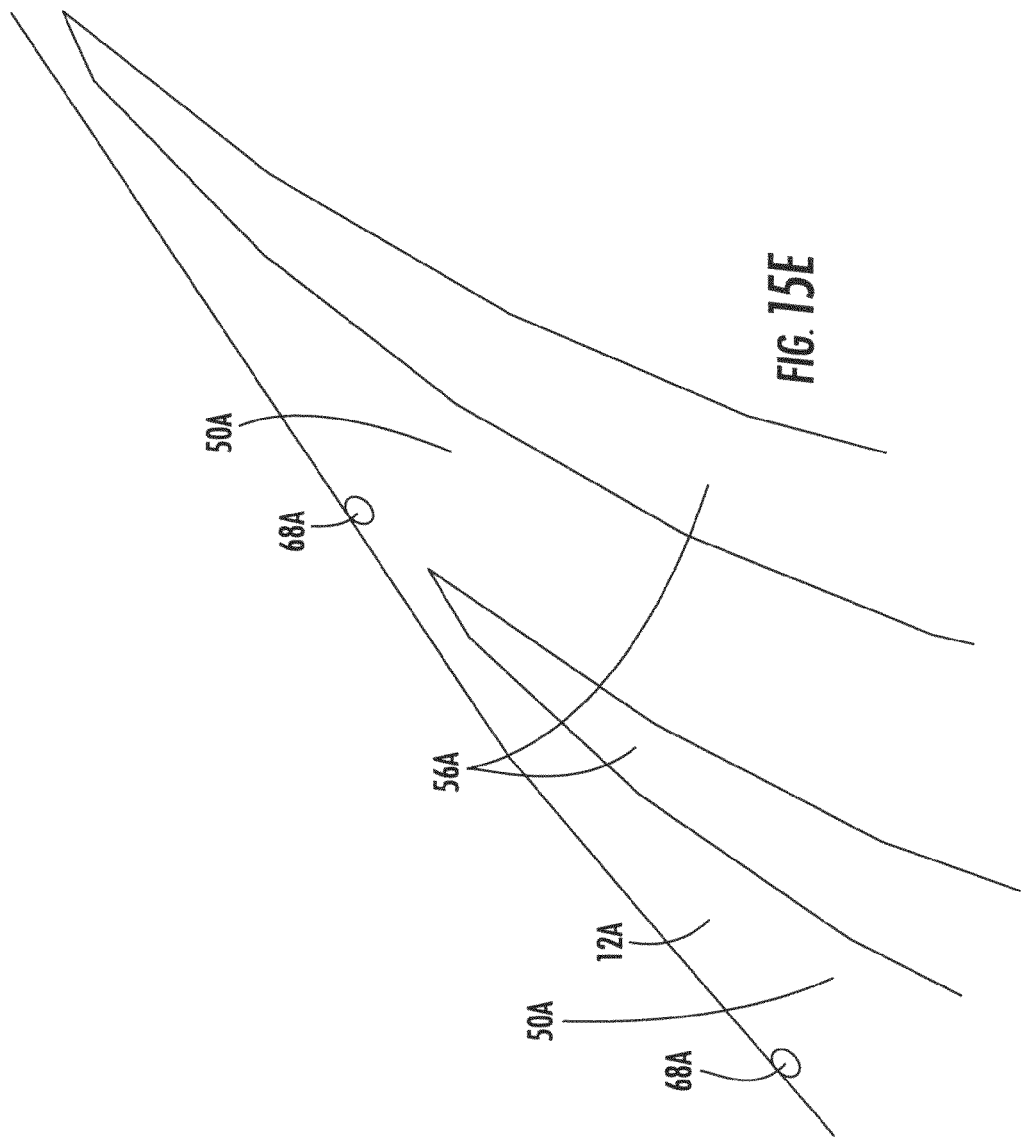

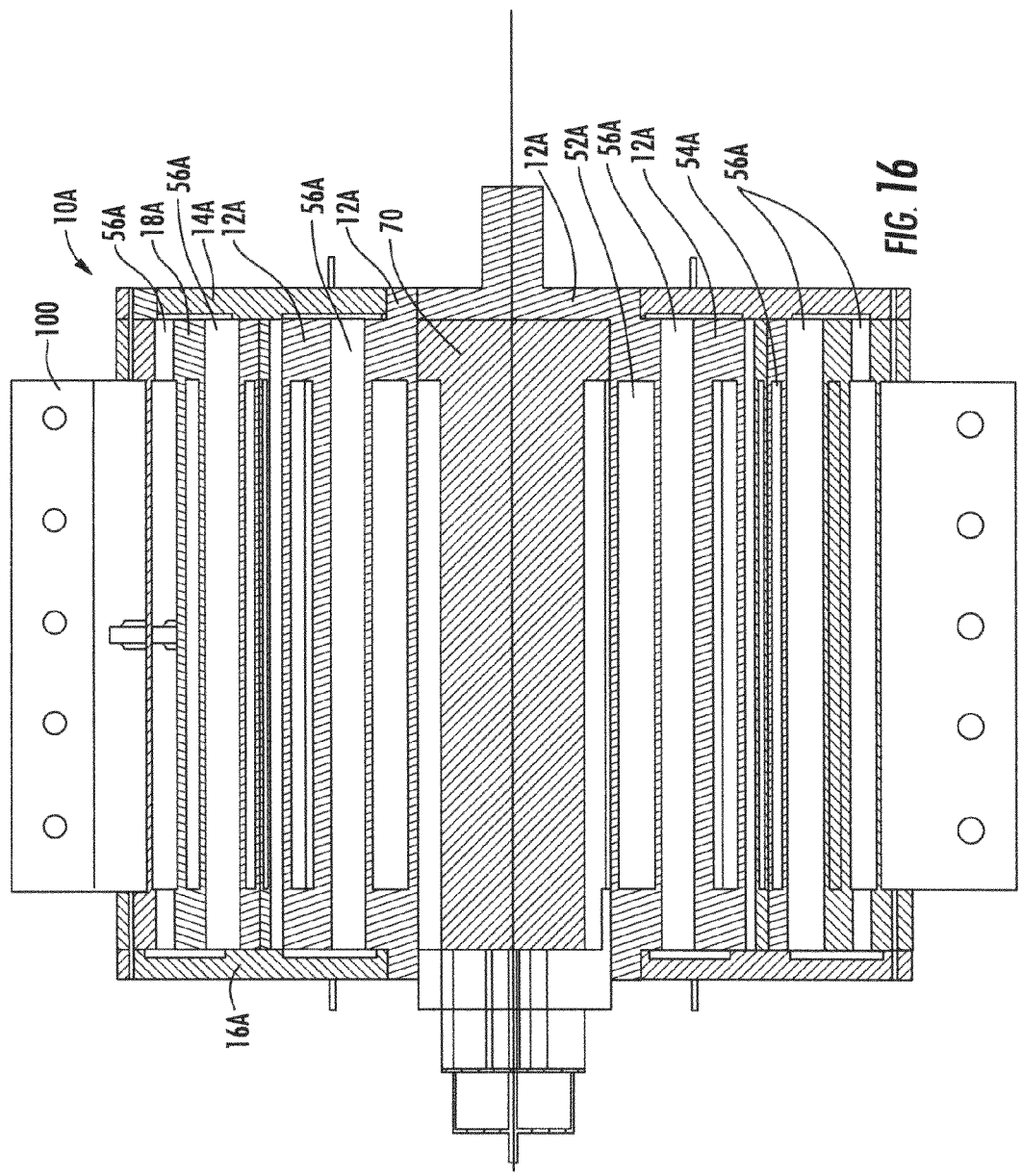

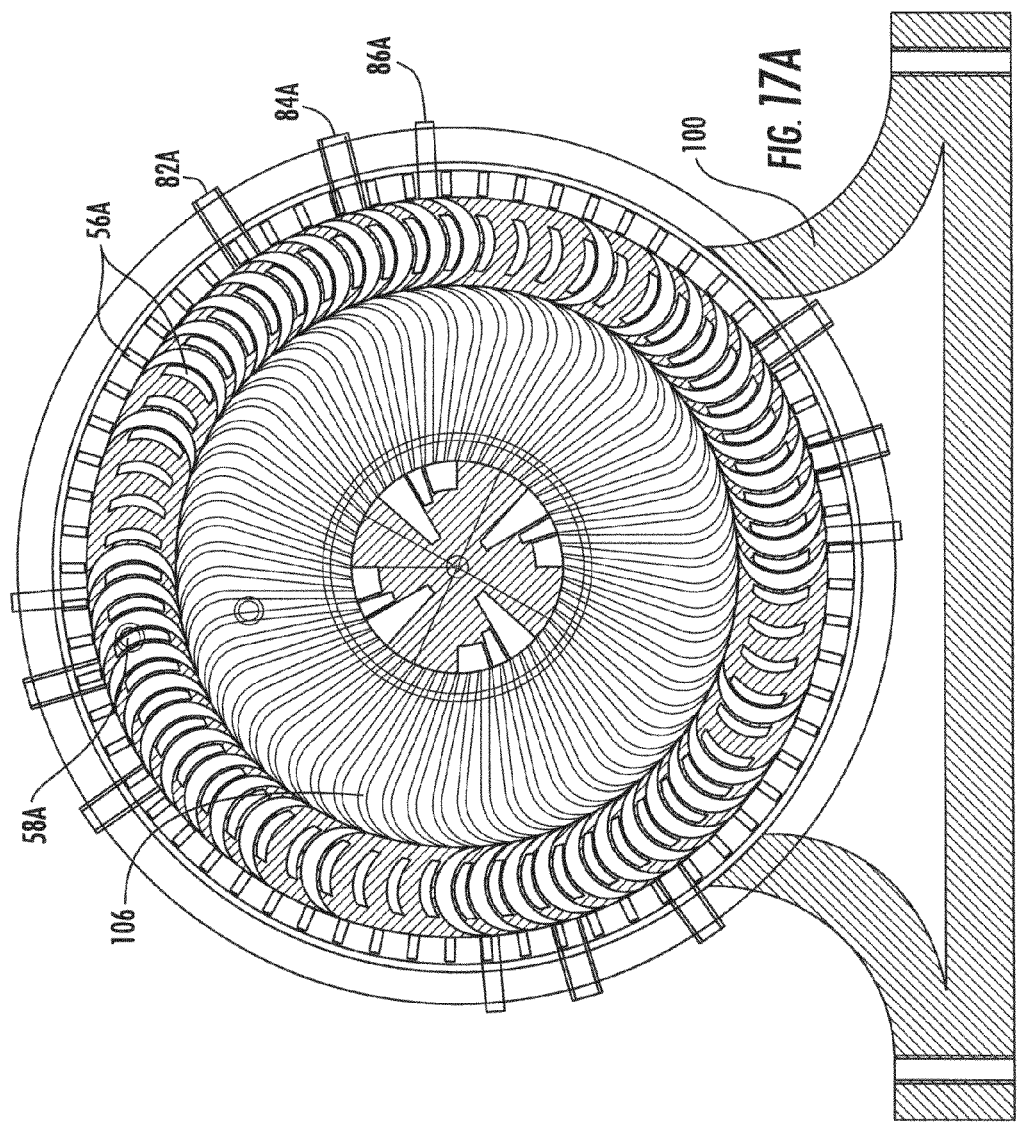

ROTARY INTERNAL COMBUSTION ENGINE FOR COMBUSTING LOW CETANE FUELS

CROSS-REFERENCE TO RELATED APPLICATIONS

This is a Continuation-in-Part (CIP) application of U.S. application Ser. No. 11/827,050 filed Jul. 10, 2007 and is hereby incorporated by reference in its entirety.

BACKGROUND OF THE INVENTION

Internal combustion engines generally are of two types: a reciprocating piston or a rotary piston. In the reciprocating piston engine, the fuel may be gasoline or diesel. Conventional gasoline engines may be either four stroke or two stroke, both of which burn the fuel so as to release thermal energy, which is then converted into mechanical energy. In the reciprocating piston gasoline engine, a mixture of gasoline and air is drawn into a cylinder, compressed by the piston, and ignited by a spark. In a diesel engine, air alone is drawn into the cylinder and is compressed to a higher ratio than in a gasoline engine, thereby increasing the air temperature, after which diesel fuel is injected into the cylinder for spontaneous ignition.

A rotary piston engine operates on the same fuel combustion principles as the gasoline engine, but utilizes a rotary piston, instead of an oscillating piston which has to be alternately accelerated and decelerated in the cylinder. Thus, the rotary piston engine obviates the forces of inertia associated with the reciprocating piston engine, resulting in higher rotational speeds. As with the reciprocating piston engine, the rotary piston engine includes the steps of drawing in the fuel and air mixture, compressing the mixture, combustion, and discharge of the burned gasses. One of the major problems with rotary engines is the seal of the three combustion chambers in relation to one another.

In a conventional four stroke reciprocating piston engine, energy is produced during the third power stroke, with energy being required for the intake and compression strokes, and for the gas expulsion stroke.

A turbine is another form of rotary engine actuated by the reaction or impulse of a current of fluid, such as water, steam or air, subject to pressure, and usually made with a series of curved veins on a central rotating shaft. In a steam turbine, the energy of steam under pressure is used for producing a mechanical rotary motion, which is often used for electric power generation. Gas turbines are driven by the combustion gasses to produce a rotary motion by deflecting the combustion gasses with rings of blades mounted on a rotor. The gas or air turbine cannot transmit its entire power output to the generator, since a substantial portion of the power is required for driving the compressor.

Internal combustion engines, as compared to turbines, are more efficient in converting thermal energy into mechanical energy. The prime reason of higher efficiency is the high compression ratio, which leads to a high combustion temperature. The fuel mixture in the combustion chamber cylinder wall and piston are exposed to very high temperature gradient for a brief time period followed by quick cooling by the introduction of fresh charge, thereby avoiding degradation of the cylinder and piston material. On the other hand, turbines do not have any reciprocating parts, and therefore run at very high speeds. Consequently, turbines impart high power output per unit weight. Unlike internal combustion engines, only the inlets of turbines are subjected to continuous highest temperatures equal to the combustion temperature. Therefore, the thermal efficiencies of turbines are limited by the maximum withstanding temperatures of the inlets. Steam turbines also run at high speeds, operate on inexpensive residual fuels and deliver high power output. However, they require enormous amount of water for cooling the condenser, which make them suitable for power stations.

BRIEF SUMMARY OF THE INVENTION

The present invention is directed to a unique internal combustion engine wherein the combustion chambers of the engine do not have any reciprocating or rotating pistons. Sliding motion in this design is either between flat or cylindrical surfaces. Therefore, the sealing problem of conventional rotary engines is eliminated in this design.

BRIEF DESCRIPTION OF THE DRAWINGS

FIGS. 1-9 show a first embodiment of the engine of the present invention.

FIGS. 10-17 show a second embodiment of the engine of the present invention.

FIG. 1A is an exploded perspective view of the first embodiment of the rotary internal combustion engine of the present invention.

FIG. 1B is an exploded side elevation view of the engine.

FIG. 3 is a sectional view of the engine.

FIG. 4A is a perspective view of one rotor segment of the engine.

FIG. 4B is a top plan view of the rotor segment.

FIG. 4C is an end elevation view of the rotor segment.

FIG. 4D is a side elevation view of the rotor segment.

FIG. 6A is an end elevation view of the casing of the engine.

FIG. 7 is a sectional view of the casing with the rotor mounted therein.

FIG. 9A is an end elevation view of the end cap.

FIG. 11A is an exploded perspective view of the second embodiment.

FIG. 11B is an exploded elevation view of the second embodiment.

FIGS. 12A and 12C are perspective views from opposite ends of the rotor of the second embodiment.

FIGS. 12B and 12D are elevation view from opposite ends of the rotor of the second embodiment.

FIG. 12E is a sectional view of the rotor of the second embodiment.

FIG. 12F is an enlarged sectional view of a portion of the rotor of the second embodiment.

FIG. 13A is a perspective view of the charger of the second embodiment.

FIG. 13B is a sectional view of the charger.

FIG. 13C is an enlarged view of the end of the charger taken along line C of FIG. 13B.

FIG. 13D is a sectional view of the charger.

FIG. 14 is a sectional end elevation view of the casing of the second embodiment.

FIG. 15A is a perspective view of the end flange of the second embodiment.

FIGS. 15B and 15C are elevation views from opposite sides of the flange.

FIG. 15D is an enlarged view taken along line D of FIG. 15B.

FIG. 15E is an enlarged view of a portion of the rotor of the second embodiment.

FIG. 16 is a sectional view of the second embodiment.

FIG. 17A is a sectional view of the engine of the second embodiment.

FIRST EMBODIMENT

Parts List (FIGS. 1-9)

Figure 2B:
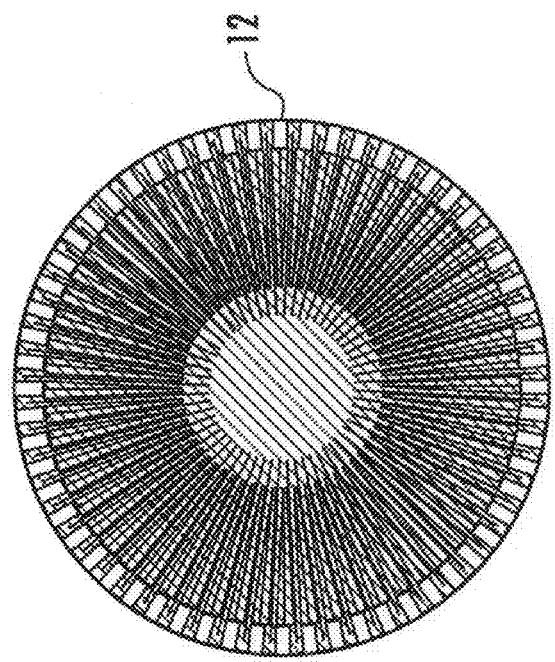
FIG. 2B is a sectional view of the rotor.
Figure 2A:
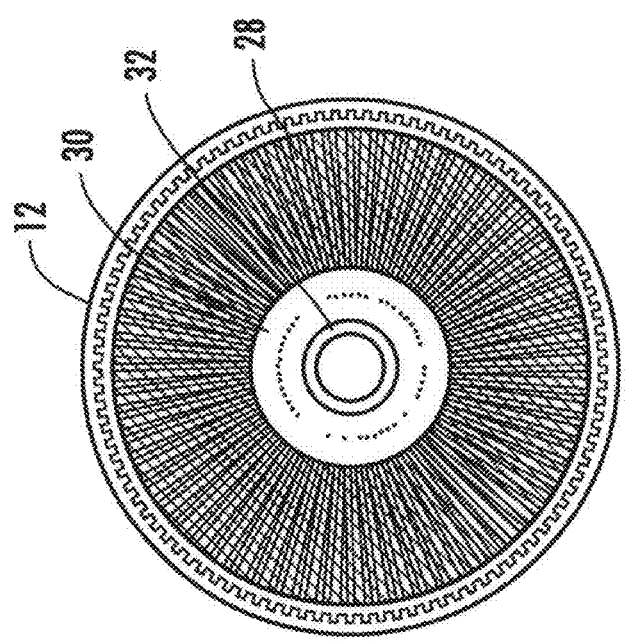
FIG. 2A is an elevation view of the rotor of the engine.

10 engine
12 rotor
13 rotor segments
14 end cap
16 end cap
18 cylindrical casing
20 air-fuel charging windows
22 ignition starting windows
23 cooling water pipe
24 cooling water outlets between adjacent wall surfaces of the combustion chambers
25 cooling air pipe
26 sealing ring
28 combustion chambers outlet
30 hub
32 shaft
34 flat surface
36 ignition starting stage
37 combustion at constant volume
38 combustion expansion to constant pressure
40 superheated steam expansion stage
42 cooling air stage
43 charge feed inlet
44 cooling water groove
45 ignition starting conduit
46 cooling air groove
47 super heated steam inlet
48 wall of outlet side of combustion chambers
49 cooling air inlet
50 combustion chamber side wall
52 combustion chamber
54 products of combustion collection canal
56 cooling water channels
58 orifice connects products of combustion collection canals
59 steam collection orifices
60 orifices for control of pressure in canals 58
62 gap between adjacent combustion chambers through which cooling water flows
64 cooling air groove on the wall
66 inlets of cooling water pipes
67 cooling water channel
68 inlets of cooling air pipes
69 cooling water channel

SECOND EMBODIMENT

Parts List (FIGS. 10-17)

10A engine
12A rotor
14A flange
16A flange
18A casing
20A air-fuel mixture inlet
23A water inlet pipe
25A air inlet pipe
28A combustion chambers outlets
46A cooling air groove
49A cooling air inlet
50A combustion chamber wall
52A combustion chamber
54A products of combustion canals
56A water canals
58A orifice
60A orifice for combustion canals
66A water cooling inlets for combustion chambers
67A water channels
68A cooling air inlet hole
69A cooling water channels
70 charger
72 oil pipe
73 oil branch
74 air-fuel mixture inlet pipe
76 air inlet pipe
78 steam inlet pipe
79 oil outlet
80 lubricating oil inlet pipe
81 water gaps
82A outlet pipe for combustion products
84A outlet pipe for steam
86A outlet pipe for air
88 ignition-starting conduit
90 orifices for steam 94 air fuel mixture slot
92 body of charger 70
94 air-fuel mixture slot
96 steam slot
98 air slot
100 motor base
102 water inlet
103 water inlet
104 water cooling pockets
106 oil passages

DETAILED DESCRIPTION OF THE FIRST EMBODIMENT

The engine of the present invention is generally designated by the reference numeral 10 in the drawings. The engine 10 consists of a rotor 12 having a plurality of segments 13, two end caps 14, 16 and a cylindrical casing 18. Sealing rings 26 are provided between the rotor 12 and the end caps 14, 16. The rotor is rotatably mounted on a shaft 32 via hubs 30 on opposite ends of the rotor. The rotor 12 has a plurality of combustion chambers 52 each having an 'air-fuel mixture charging' window 20, an ignition starting window 22, and a chamber outlet 28. Each chamber 52 also has cooling water pipes are conduits 23 within inlet 66 and an outlet 24, and cooling air pipes or conduits 25 with an inlet 68 and an outlet.

Figure 5C:
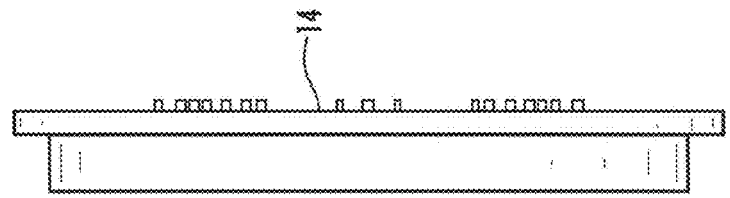
FIG. 5C is a side elevation view of the end cap.
Figure 5B:
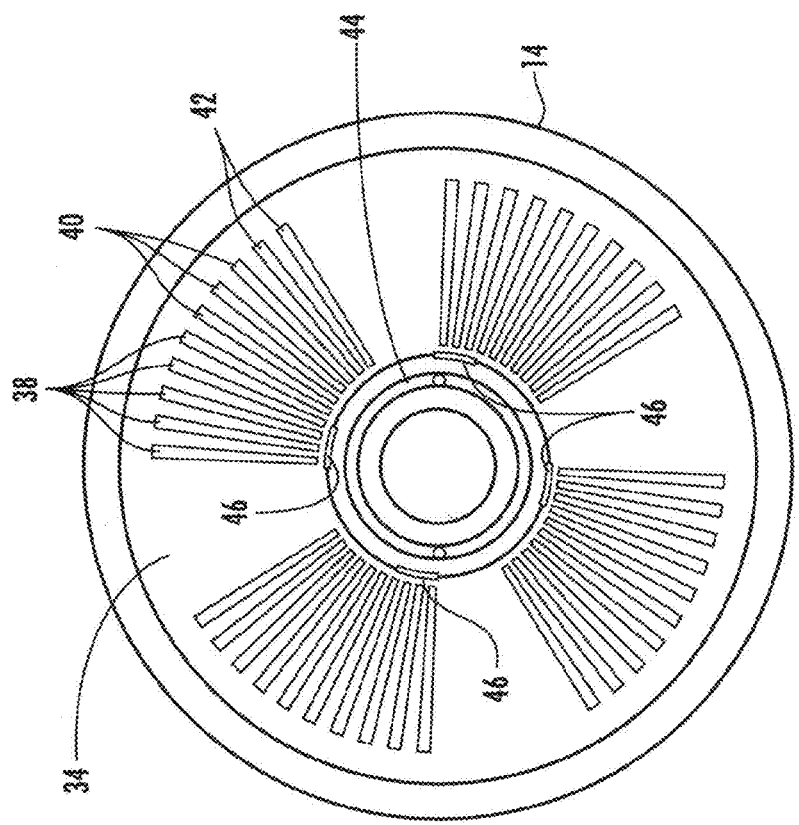
FIG. 5B is an end elevation view of the end cap.
Figure 5A:
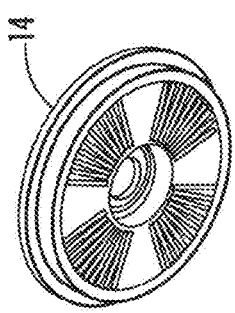
FIG. 5A is a perspective view of one of the end caps of the engine.

The combustion chambers 52 are identical and equally spaced. These chambers 52 are successively charged (in sequence) with air-fuel mixture, super heated steam and cooling air through the charging windows 20. FIG. 5 shows the surface 34 of the end caps 14, 16 which faces the outlets 28 of the combustion chamber 52. The end caps 14, 16 are mirror images of each other. The part of the flat surface 34 exposed to the outlets 28 of the combustion chambers 52 define an ignition starting stage 36. The products of combustion expand in next five canals, which define a combustion expansion stage 38. In next three canals, super heated steam expansion occurs, thus defining a steam expansion stage 40. The last two canals allow flow of cooling air, and define a cooling air stage 42. Cooling water grooves 44 and cooling air grooves 46 allow water and air to flow therethrough.

Figure 6B:
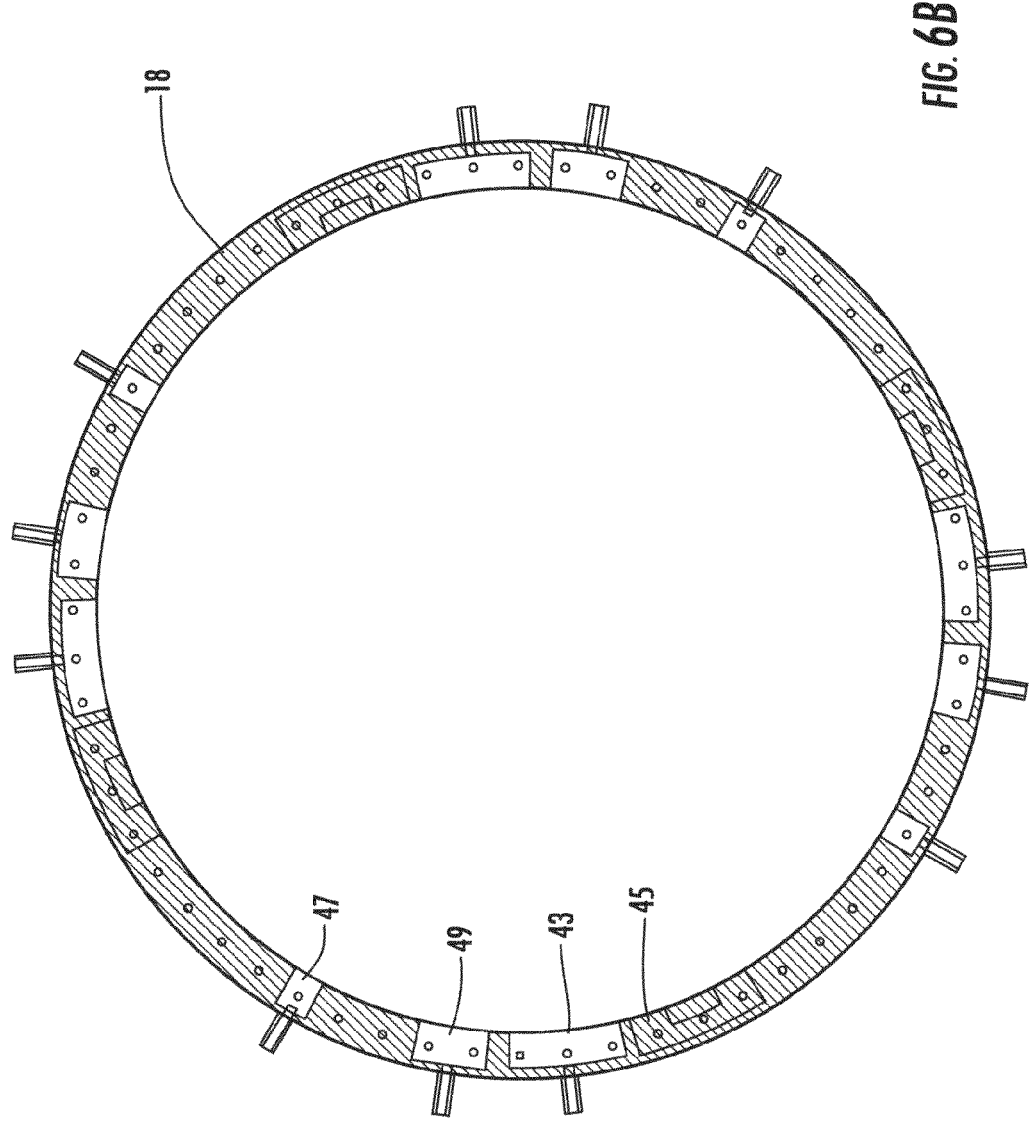
FIG. 6B is a sectional view of the casing.
Figure 8B:
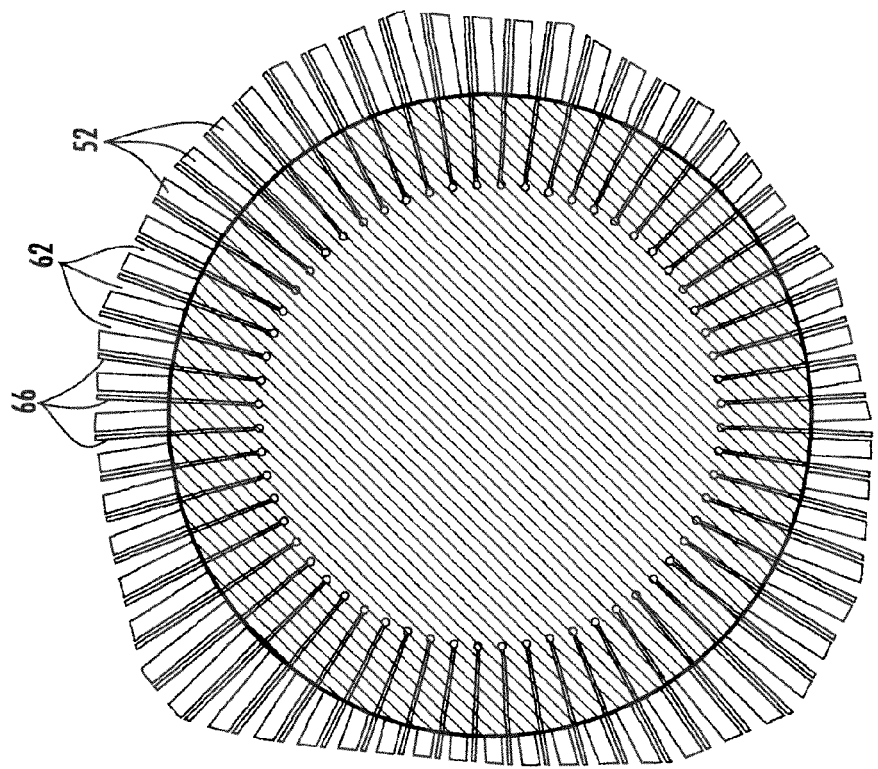
FIG. 8B is a sectional view of a portion of the rotor.
Figure 8A:
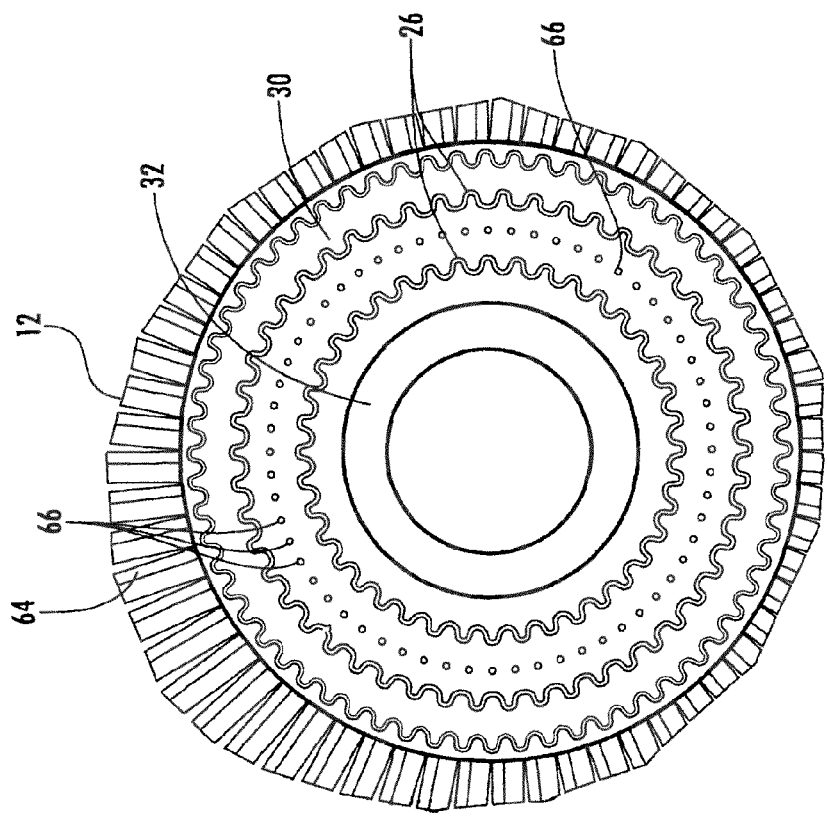
FIG. 8A is an enlarged end view of a portion of the rotor.
Figure 9B:
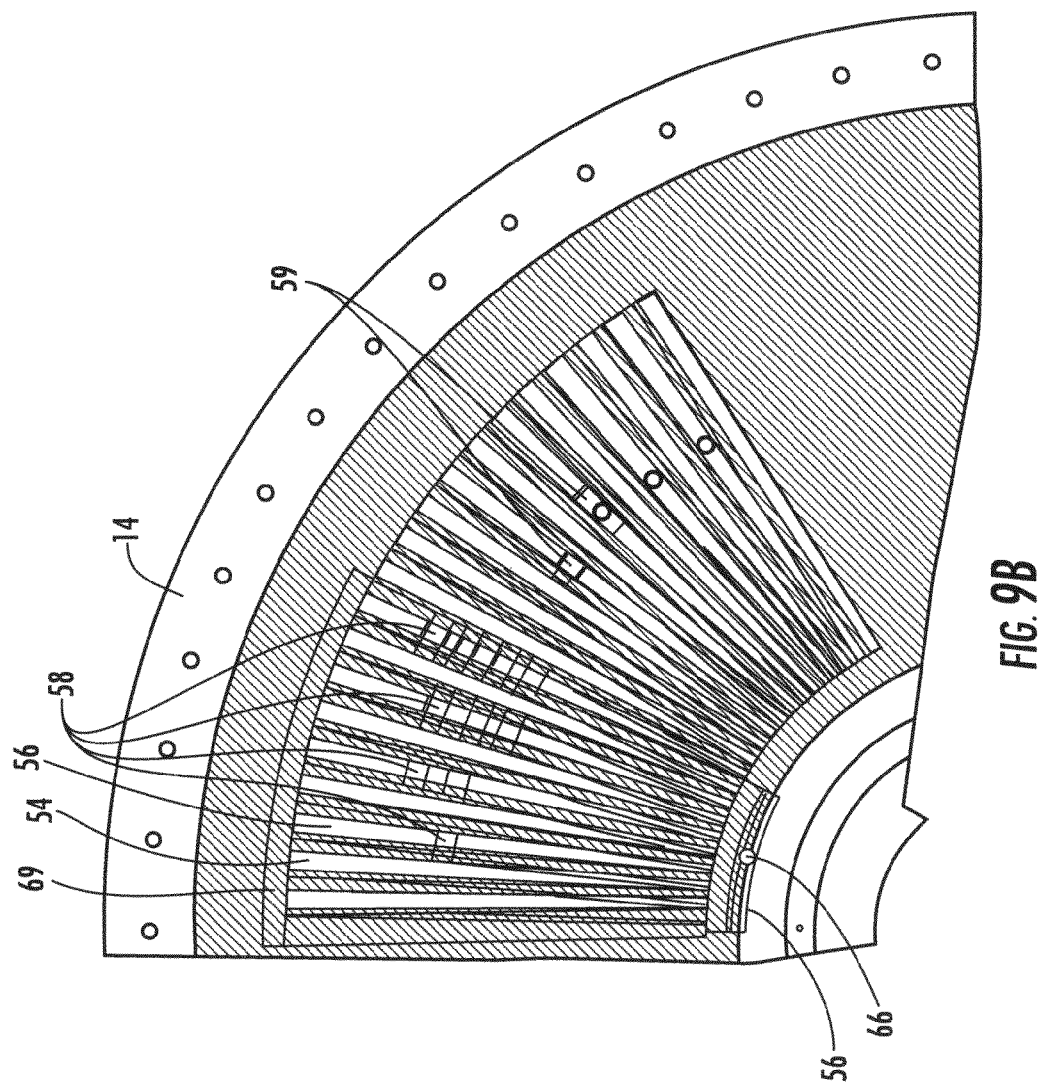
FIG. 9B is an enlarged elevation view of one quartile segment of the end cap.
Figure 10C:
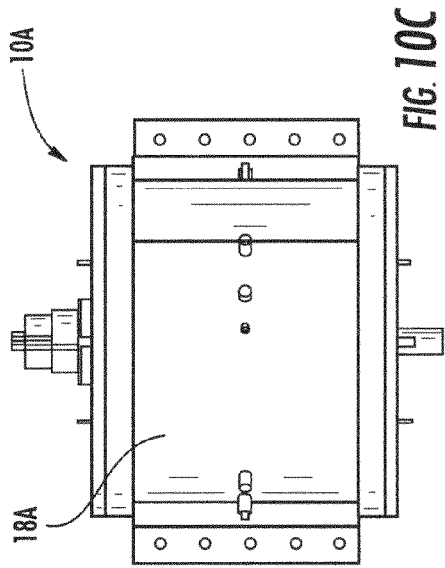
FIG. 10C is a top plan view of the second embodiment.
Figure 10D:
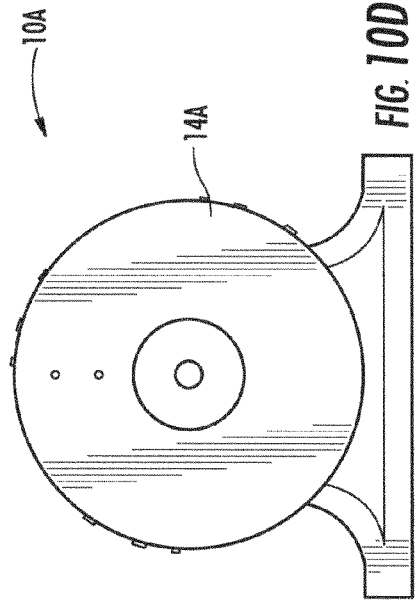
FIG. 10D is an end elevation view of the second embodiment.
Figure 10A:
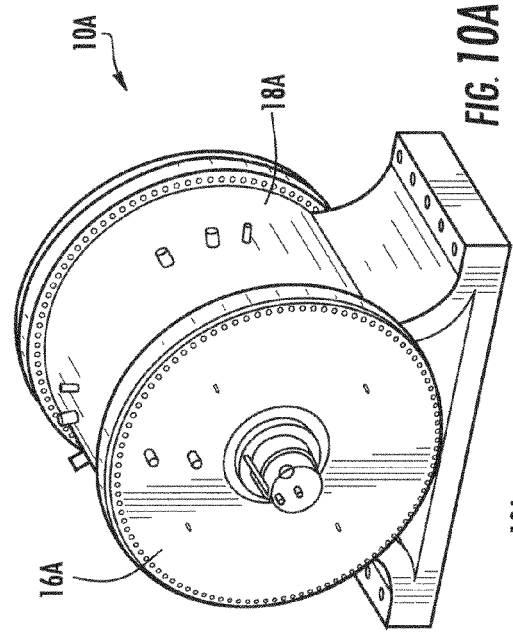
FIG. 10A is a perspective view of a second embodiment of a rotary internal combustion engine according to the present invention.
Figure 10B:
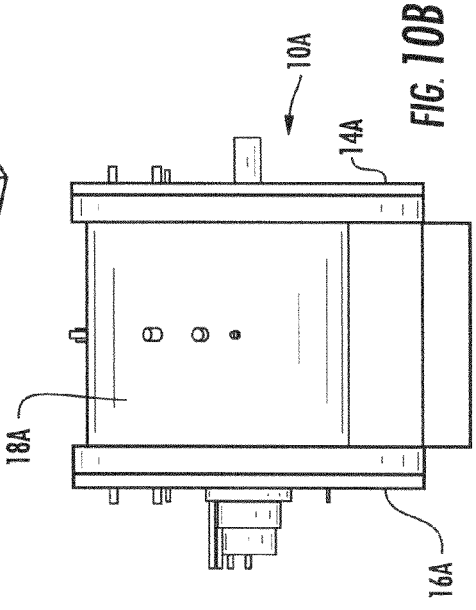
FIG. 10B is a side elevation view of the second embodiment.

FIGS. 6 and 7 show the outer casing 18 with four groups of inlets. Each group contains a charge feeding inlet 43, a pair of ignition starting conduits 45, a super heated steam inlet 47 and a cooling air inlet 49. FIG. 4 shows a single combustion chamber 52 with the outlet 28. The front faces of the curved side walls 50 have grooves 40 for cooling air. The cross-sectional shape of each combustion chamber 52 is a trapezoidal (the cutting plane is normal to the path of sweep of the combustion chamber). It is noted that the top and bottom edges of any trapezoidal section are curved.

The end caps 14, 16 have canals 54 through which combustion products, steam and air flow. These canals 54 are cooled by water flowing through channels 56. Orifices 58 connect successive canals 54.

The end faces of the hubs 32 have a plurality of cooling water inlets 66 and a plurality of cooling air inlets 68 located radially outwardly from the water inlets 66. These inlets 66, 68 are formed in sinusoidal rings.

Operation

Consider one of the combustion chambers 52 of the rotor 12 facing the flat surfaces 34 of the end caps 14, 16. In the first 18 degrees, the chamber 52 is filled with air-fuel mixture. The mixture is preferably pre-compressed by an external compressor (not shown) prior to introduction into the combustion chambers 52. In the next 6 degrees, charge ignition starts by a flame front and high pressure products of combustion, followed by six degrees constant volume combustion. At this stage, the products of combustion chamber 52 are at their highest temperature and pressure. Some portion of these hot combustion products is introduced through a conduit to start ignition in the chamber ready to be fired. This air-fuel charge continues to burn and under five successive sets of a constant volume combustion process followed by expansion to a constant pressure for next 30 degrees. The hot products of combustion flow at high speed from the combustion chamber 52 into the end cap 14, 16 via longitudinally shaped nozzle canals 54. The drop in pressure in the canals 54 is controlled by sets of orifices 60 in the canal walls. The canal 54 facing the combustion chamber at 54-60 degrees section collect the product of combustion and direct it to auxiliary equipments. The high kinetic energy of the flowing products of combustion provide thrust to spin the rotor 12 within the casing 18. Maximum utilization of the energy is achieved if the products of combustion are exhausted at the maximum possible velocity perpendicular to the axis of rotor 12. This means, all chambers 54 should be semi-circular or as close as possible to the semi-circular shape, and the outlet sides of the combustion chambers are longitudinally shaped nozzles or circular nozzles.

For the next 18 degrees, the chambers 52 are filled with wet steam or high pressure superheated steam from a super heater. The exhaust of superheated steam into the canals 54 gives part of the output energy of the engine 10. Flowing superheated steam scavenges the residual products of combustion and partially cools the walls 48 of the combustion chamber 52. The last 12 degrees, the chamber 52 is charged with cold air to scavenge residual steam and cool and dry the walls of the chamber so that they are ready to receive new air-fuel charge.

The air-fuel mixture can be pressurized before charging; the compression pressure depends on the cetane number of the used fuel. Four air-fuel charges are burnt in each combustion chamber for each 360° revolution; one air-fuel charge in each quarter. For a rotor of 60 combustion chambers 52 revolving at 5500 rpm, 22,000 air-fuel charges are burnt per second.

For rotor 12, the combustion chambers 52 are curved in the radial direction. In this case, the air-fuel mixture, the superheated steam and cooling air enter from the center of the rotor 12 and flow radially outward and exhausts from the cylindrical casing 18. The cooling water, which cools the chambers 52 and channels of the cylindrical casing 18, enters the engine 10 through the end cap 14 and exits from the other end cap 16.

Figure 18A:
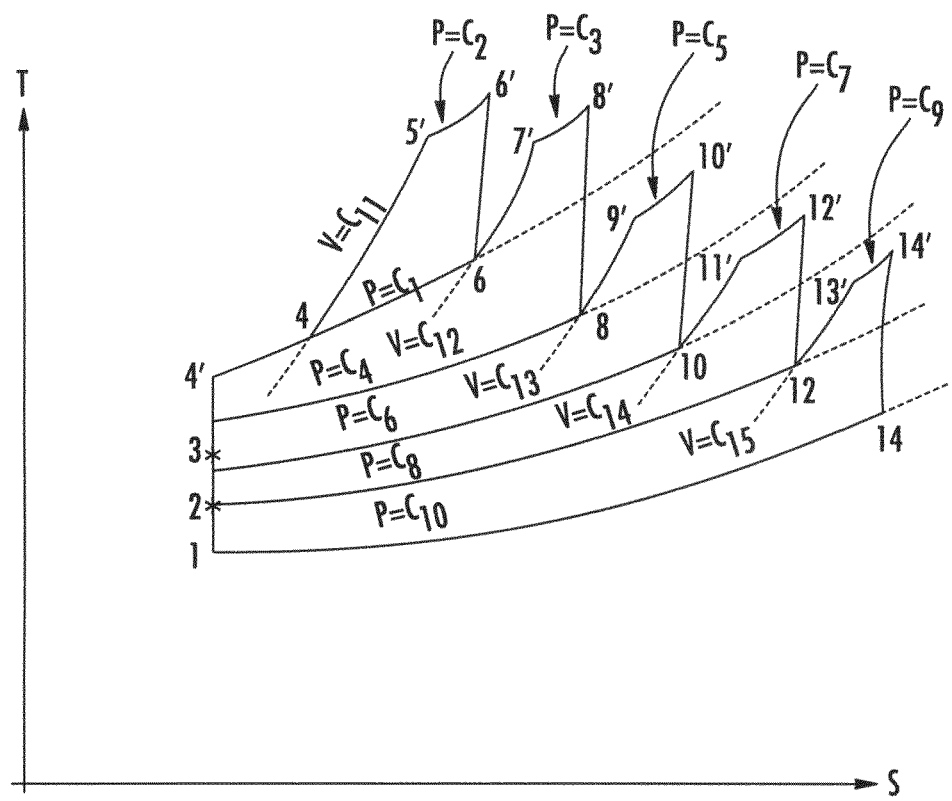
FIG. 18A is a graph showing the air standard cycle for the engine of the present invention.
Figure 18B:
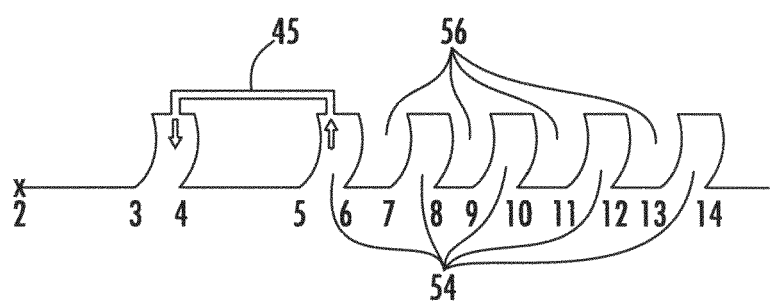
FIG. 18B is a schematic view of channels and canals of one of the end caps, corresponding with the operational points 1-14 in FIG. 18A.

The products of combustion are exhausted at a high temperature, pressure and velocity. FIGS. 18A and B show an air standard cycle for the engine 10. After the air and fuel mixture is introduced into each combustion chamber 52 at point 1 in FIGS. 18A and B, there is a time delay in which the charge is compressed by products of combustion flowing out of one combustion chamber into another chamber, identified by points 2, 3 and 4 in FIGS. 18A and B. Between points 1 and 2, the air-fuel mixture is compressed by an external compressor. Between points 2 and 3, the mixture is compressed by the rotating rotor 12. Between points 3 and 4, the mixture is further compressed by high pressure products of combustion flowing through the conduit 45 from one canal 54 into the adjacent combustion chamber 52. As seen in the graph of FIG. 18A, as the combustion process continues through points 4-14, the five sets of combustion at constant volume and constant pressure allows for complete burning of the air-fuel mixture charge. The constant volume portion of the combustion process is represented by the inclined lines extending between points 4-5, 6-7, 8-9, 10-11 and 12-13, wherein the constant pressure portion of the process is represented by the vertical lines extending between points 5-6, 7-8, 9-10, 11-12 and 13-14. In the graph of FIG. 18A, the X axis represents entropy (S) and the Y axis represents temperature (T). The following table further explains the process of FIGS. 18A and B:

The constant volume portions of the combustion processes are represented by the inclined lines extending between points 4-5', 6-7', 8-9', 10-11' and 12-13', wherein the constant pressure processes are represented by the inclined lines extending between points 4'-4, 5'-6, 7'-8, 9'-10, 11'-12, and 13'-14' in the graph.

1-2 compression by compressor 2-3 adiabatic compression by rotor 3-4' adiabatic compression by products of combustion

| Combustion at Constant Pressure | Combustion at Constant Volume | Adiabatic Expansion |
|---|---|---|
| 4'-4 | 4-5' | 6'-6 |
| 5'-6' | 6-7' | 8'-8 |
| 7'-8' | 8-9' | 10'-10 |
| 9'-10' | 10-11' | 12'-12 |
| 11'-12' | 12-13' | 14'-14 |
| 13'-14' | | |

Thus, the combustion process in the engine 10 has two phases: constant volume at increasing pressure and constant pressure at increasing volume. As the charge is compressed, the temperature increases to a point of self combustion. Thus, the engine 10 has the benefit of combustion from both the flame front and the increased pressure of the charge.

Cooling System

The combustion chambers 52 are cooled by water, steam and air. The side walls 50 of combustion chambers 52 are cooled by water flowing radially outward through gaps (see Appendix Drawing 17). A second cooling phase is carried out by charging steam into the combustion chambers 52, followed by cooling air. The products of combustion may have a temperature of 5000° F., while the steam is at 1000° F. Of the canals 54 in the end caps 14, 16 collect the hot products of combustion and are cooled by water flowing in channels which sandwich the canals, as best seen in the Appendix drawings. Water enters from one side and collected from the other side. Hot canals 54 are cooled by air flowing through grooves facing the front sides of the canals in contact with the combustion chambers 52. Air mixes with the hot products of combustion and lowers the temperature to a value which the material of the end caps 14, 16 can withstand. The wet steam (some quantity of water is converted into steam during cooling process) exiting the engine 10 is passed through steam separators. The separated steam is directed to a super-heater (not shown) and water is re-circulated by a water pump (not shown). Appendix Drawing 19 shows the design of rotor 12 in which one set of ignition starting windows 22 in each quarter are closed. This design inactivates one of the ignition-starting conduits in the casing 18. The inactive conduit is cooled externally by water and internally by air.

The air-fuel mixture is also relatively cool, so as to provide a cooling function when introduced into the combustion chambers 52.

Sealing System

The engine 10 has no sliding motion in the combustion chambers 52. Sliding motion in the engine 10 is only between the rotating rotor 12 and the fixed end caps 14, 16 and casing 18. Sealing problems between two cylindrical surfaces or between a cylindrical and a flat surface have been extensively studied and various solutions have been proposed in mechanical engineering design literature. In this case, however, a new solution is proposed that uses the sinusoidal sealing rings 26 (see Appendix Drawing 15). These sealing rings 26 are lubricated with steam. Areas where steam is unavailable, oil lubricants will be used as an alternative. In that case, the sealing rings 26 will be used in pairs and oil will be introduced in the spacing between the sealing rings 26.

Load and Rotor Revolution Speed Control

The variation in air-fuel mixture and compression pressure of air-fuel mixtures are most commonly used methods, to control the speed and load of the engine 10. In addition to these methods, control on load and speed can be achieved by reducing the number of chambers charged per revolution. The charging and ignition sequence should be adjusted accordingly.

Motor Starting and Firing

The method used to start conventional gas turbine can be used to start the engine 10. Once the rotor 12 is rotating, the combustion chambers 52 will be ignited sequentially as explained above. It may be noted that the ignition process exploits both the compression ignition and flame front ignition. Ignition starting conduits through pressure difference introduces the part of the inflammable, hot, high pressured combustion products into the combustion chamber 52 ready to be ignited. The introduction of the part of these hot, pressurized products which initiates numerous secondary self ignition and flame fronts as a result at different points in the combustion chamber 52.

This engine 10 can use different types of oil and gas fuels which include low grade fuels, very low cetane number fuels and specially treated pulverized coal. The specially treated pulverized coal is obtained by soaking dried coals under pressure with medium cetane number gaseous or oil fuels. This treated coal will be used with very low cetane fuel. The flame front will burn the medium cetane fuel in the pores which will burn pulverized coal particles and initiate burning of low cetane fuel surrounding the coals. Such inexpensive fuels typically cannot be used in conventional combustion engines since they do not burn well.

More particularly, it is known that compression engines are more efficient than spark ignition engines. The difference in efficiency is between 15% and 20%. Experiments showed that it is impossible to ignite and burn low Cetane number fuels by compression no matter how high the compression ratio.

It is also known that coal is a porous material by nature. Microscopic inspection shows the presence of pores in pulverized coal particles. These pulverized coal particles will burn if dried and soaked, under low pressure for enough time, with a mixture of air-medium Cetane number fuel. This specially treated pulverized coal, if it is mixed in small percentage with low Cetane number fuel, will be scattered in the combustion chamber and surrounded with air-low Cetane number fuels mixture. When the mixture is exposed to high pressure, the air-fuel mixture in the coal pores will ignite and begin to rush out of the pores in all directions. The flame of this burning mixture will burn the surrounding low Cetane number fuel and the coal particles. The low Cetane number fuel will then burn under high pressure, i.e. by compression.

Any porous material, whether it is natural or synthetic, will be suitable to be used as a fuel carrier with the engines described above. Also, small size capsules made of membranes filled with an air-medium Cetane number fuel mixture could be used, instead of the specially treated pulverized coal. For example, these capsules can be made by injecting cold air or medium Cetane number fuel into a small diameter capillary tube positioned within another capillary tube. Hot, in-liquid-phase membrane material will be pumped in the space between the two capillary tubes.

Small membrane spheres will then begin to form, filled with the air or fuel injected in the small diameter pipe. These spheres will be exposed to a blast of cold air or fuel which has the higher osmotic pressure at high velocity. The drag force of the flowing air or fuel will, at a certain instant, take off the spheres, which can be strained and collected. The spheres will then be soaked with air or fuel depending which of them as higher osmotic pressure for enough time.

These spheres could then be used with the low Cetane number fuel instead of the specially treated pulverized coal.

The air-fuel mixture in these capsules will ignite and burn if it is exposed to high pressure and burn the membrane and the surrounding air-low Cetane number fuel mixture existing within the same combustion chamber by compression.

Calculations of Engine Power Output

The dimensions of the engine 10 and combustion chambers 52 depend on the purpose of use. For example, for a power station, 1 meter long rotor, 0.45 meter hub radius and 0.3 meter long (in radial direction) combustion chambers are reasonable dimensions.

Based upon above dimensions, the output power of the engine can be calculated as described below.

There are sixty combustion chambers 52 in the rotor 12. Each combustion chamber cross-section covers 6 degrees angular displacement. This angle '$\theta$' in radians is equal to $$\theta = \frac{6}{180} \times \frac{22}{7} = \frac{1}{30} \times \frac{22}{7}$$

The area of the combustion chamber is $$A = \int_0^{\frac{1}{30} \times \frac{22}{7}} \int_{45}^{75} r\,dr\,d\theta - 1 \times 30 = 158.57 \text{ cm}^2$$

The volume of the combustion chambers is $V = 158.57 \times 100 = 15857 \text{ cm}^3$ Each combustion chamber will burn four charges per revolution. If the rotor speed is 5500 rpm, volume of the air-fuel charged per second at 1 atmosphere is $$15857 \times 4 \times 60 \frac{5500}{60} = 348857143 \frac{\text{cm}^3}{\text{sec}} = 348.857 \frac{\text{m}^3}{\text{s}}$$

However, air-fuel mixture is pre-compressed before charging. The pressure to which the air-fuel mixture is pressurized depends on the fuel cetane number. The pressure value usually ranges from 15-35 bars.

If the air-fuel charge is compressed to 35 bars, then the volume of charge in the combustion chambers per second is $$348.857 \times 35 = 12210 \frac{\text{m}^3}{\text{s}}$$

If the excess air is 15% and the air density at normal temperature and pressure is 1.03 kg/m³ and the air-fuel ratio for complete combustion is 16, the weight of fuel which burns per second is $$12210 \times \frac{1.03}{1.15} \times \frac{1}{16} = 683.494 \frac{\text{Kg}}{\text{s}}$$

If the calorific value of the used fuel is 14000 Kcal/Kg, the thermal energy liberated is $$683.494 \times 14000 = 9568924 \frac{\text{Kcal}}{\text{s}}$$

One Kilo calorie=426.8 Kg-m and for every horse power=75 Kg-m/s. Therefore, the output power of the engine is $$H.P_{out} = \frac{9568924 \times 426.8}{75} \eta_o$$

$$H.P_{out} = 54543556.35 \eta_o h.p$$

If the air-fuel mixture compressed is 15 bars, $H.P_{out} = 23337238.48 \eta_o$ h.p. If the excess air is 200 percent, $H.P_{out} = 8945941.4 \eta_o$ h.p.

DETAILED DESCRIPTION OF THE SECOND EMBODIMENT

The first and second embodiments of the engine of the present invention are based on the same principals. As shown in FIGS. 10-17, in the engine 10A of the second embodiment, the combustion chambers 52A are curved in the radial direction. In this case the air fuel mixture, the superheated steam and cooling air are charged from a charger 70 in the center of the engine 10A and flows radially outward and exhaust from the cylindrical casing 18A.

The cooling water which cools the chambers 52A and canals 54A of the cylindrical casing 18A enters the engine 10A from one flange or end cap 14A and leaves from the other flange or end cap 16A. The cooling air which cools the hot ports of the cylindrical casing 18A enters from both flanges 14A, 16A through holes drilled in the side walls of the rotor 12A and spread through longitudinal openings on the outer cylindrical surface of the rotor 12A.

The combustion chambers 52A have chamber walls 48A, cooling water canals 56A and cooling air grooves 64A. The charger 70 has a lubricating oil pipe 79.

FIG. 13B is a longitudinal section of the charger 70 where hidden lines are shown. Parts AA, BB, and CC are parts of the charger 70 from where cooling air, super heated steam and air fuel mixture flow into special slots in the charger 70 to feed the combustion chamber 52A. The charger 70 has a body 92 with slots 94, 96, 98 for air-fuel mixture, superheated steam and cooling air, respectively, as seen in FIG. 13D. The cylindrical part 92 of the charger 70 resides between the air-fuel mixture slot 94 and the steam filled slots 96. Each of the air-fuel slots 94 and steam charging slots 96 are to cover 15 degree angles, while air cooling slot 98 covers 10 degrees of angle. The charger body 92 between slots 94 and 98 of adjacent chambers, where ignition starts with successive combustion at constant volume followed by expansion to a constant pressure, covers 48 degrees.

FIG. 14 is a section of the cylindrical casing 18A and the motor base 100. In both the charger 70 and the cylindrical casing 18A there are four identical sectors. Air-fuel charging is shown to cover 18 degrees angle, steam expansion 18 degrees, and air cooling angular positions is shown to be 12 degrees. Ignition followed by combustion at constant volume each cover 6 degrees. Five successive constant volume combustion processes each is followed by combustion-expansion to a constant pressure process are to cover 30 degrees.

FIG. 15A-D show the side views of an end cap 14A with cooling water feeding points 102. Cooling water pockets for cooling the rotor 12A and cylindrical casing 18A are labeled 104. Air cooling groove and air cooling inlet pipe are labeled as 46A and 68A, respectively.

FIG. 16 shows sectors of the engine 10A assembled where the rotor 12A, the cylindrical casing 18A, the flanges 14A, 16A and the charger 70 are shown in cross section. The engine base 100, combustion chambers 52A and cooling water canals 56A are shown, along with products of combustion collection canals 54A and cooling water canals 56A in the casing 18A. FIG. 17A shows a section of the engine assembled. A conduit where the flame and hot products of combustion flow to ignite a charge into the combustion chamber is labeled as 110. Cooling water canals in the casing are labeled as 56A. Orifices connect products of combustion collection canals 54A are labeled as 58A. Outlet pipes for combustion products, steam, and air are labeled as 82A, 84A, 86A, respectively. Lubrication oil passages are 106.

FIG. 15E is detailed drawing for the part of the rotor facing the flange where part of the side wall, cooling water canals and inlet of air cooling feeding points are labeled as 50A, 56A, and 68A, respectively.

Figure 17B:
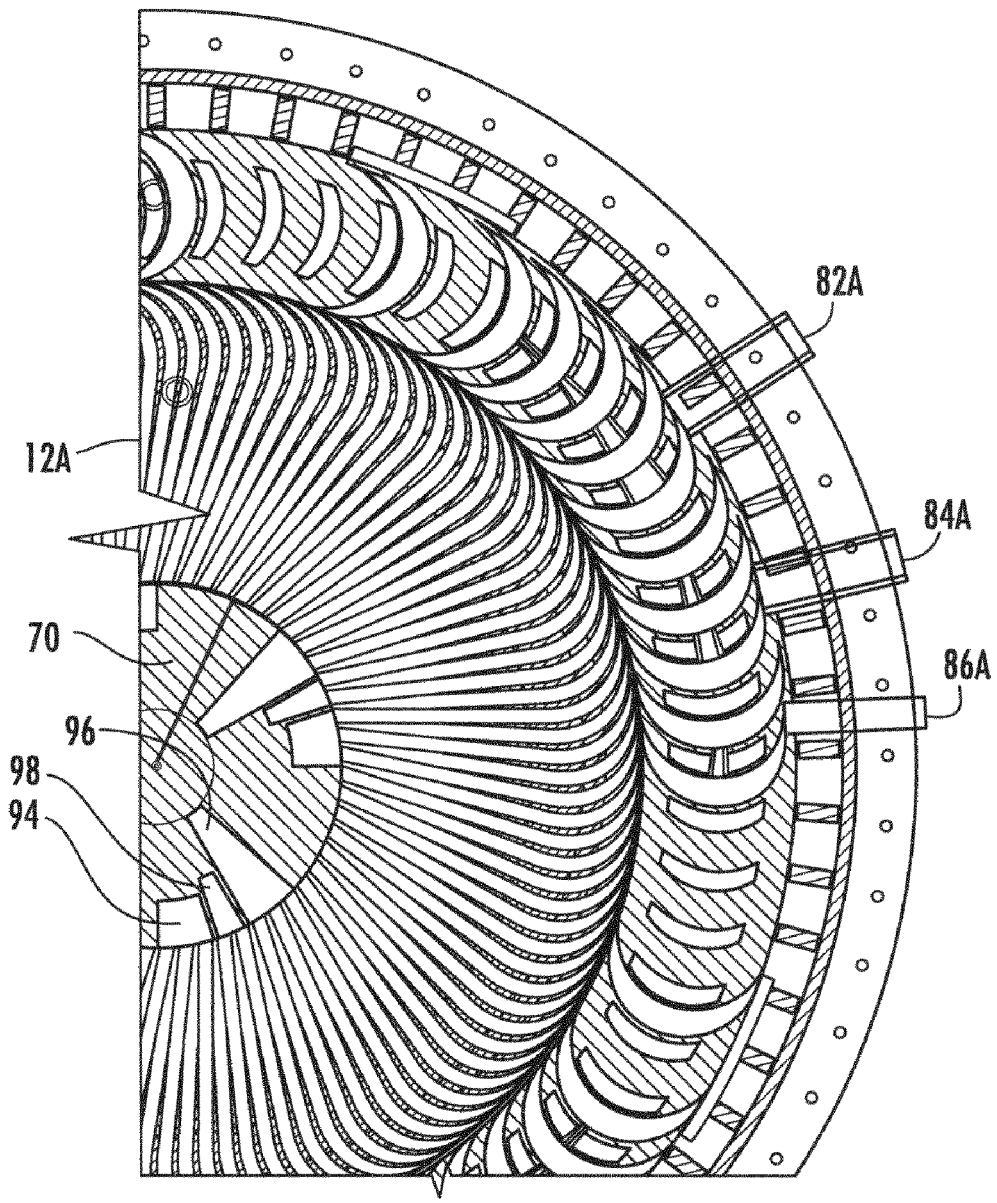
FIG. 17B is an enlarged view of one quartile segment of the engine of the second embodiment.

Operation:

FIG. 17B shows one of the four quarters of a section of the assembled engine 10A. Assume that the inlet side of a rotating combustion chamber 52A has just been covered by the beginning of one of the air-fuel slots 94 of the fixed charger 70 and the discharge side of the chamber covers the last two degrees of the cooling air collection canal 104. At this stage pressurized air-fuel mixture from the charger 70 fills the combustion chamber 52A and scavenges entrapped cooling air. In the next 15 degrees charging of the chambers with pressurized air-fuel mixture continues. The inlet side of the chamber 52A is then completely covered by the cylindrical part of the charger 70. After 2 degrees ignition of the air-fuel begins by interaction of the charge with inflammable products of combustion at high pressure discharged out the duct 82. This combustion process continues at constant volume for 6 degrees, followed by simultaneous combustion and expansion to a constant pressure for the next 6 degrees. At this stage part of the burning charge is ejected at high velocity out of a longitudinal nozzle or set of nozzles of circular cross sections into the first products of combustion collection canal 54A. A segment of the ejected gases flows through the duct 82 to ignite a charge ready to be fired in a chamber next to the following chamber. The remainder of the ejected gases flows through a set of orifices.

Four sets of constant volume processes followed by simultaneous combustion-expansion process occur in the next 24 degrees. Collected products of combustion are piped out of the casing 18A to the superheater (not shown) through the outlet 82. The superheater is used to super heat the saturated steam separated from the engine cooling water.

In the next 18 degrees superheated steam from the charger 70 expand in the chamber and is ejected out of the discharge side. The high kinetic energy of the existing gases and steam passing through the nozzles provide thrust to revolve the rotor 12A. Expanding steam in the combustion chamber 52A scavenges residual products of combustion and cools the walls of the combustion chamber.

In the next 12 degrees, the chamber 52A is charged with cold air through the charger to remove entrapped steam and to cool and dry the walls of the chamber so that they are ready to receive new air fuel charge. Cooling air flowing out the chamber is exhausted out of the outlet 86. Maximum efficiency is achieved when the combustion chambers eject products of combustion and steam and are charged in the direction perpendicular to the rotor's axis at the maximum possible velocity. This means that the chambers should be U shaped or semi-circular and the discharge side is nozzle shaped.

Following the same procedure as explained above for the first embodiment, the power output for the second embodiment is 88653.47 $\eta_o$ h.p. The rotor in this case is 0.1 m long, with an inside diameter of 0.2 m. The length of the combustion chamber in the radial direction is 0.1 m. The air-fuel mixture pressure is 15 bars. Excess air is 200% and the total area of combustion chambers is equal to the total area of combustion chamber walls.

An appendix of colored drawings facilitates understanding of the present invention. The combustion chambers 52 are colored in the Appendix as follows for each quarter: 3 Brown for charging, 7 Red for ignition and combustion, 3 White for superheated steam charge, 2 Gray for cooling air. The same pattern is used for the end caps 14, 16 with the exception of the brown color of air-fuel charged mixture. The parts indicated as red color are very hot and need an effective cooling system, as described previously.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. A method of combusting very low Cetane number fuels by compression of an engine having a casing, a charge inlet, an outlet, a rotor and a multiple combustion chambers, comprising:
    soaking dry, pulverized coal under pressure in a mixture of air and at least one of medium Cetane number gaseous and oil fuels to produce treated pulverized coal having pores in the coal filled with the mixture;
    adding the treated pulverized coal to charges of mixture of air and very low Cetane fuel through the charge inlet of the casing into the multiple combustion chambers;
    burning the treated pulverized coal and low Cetane number fuel by compression of the engine; and
    exhausting products of combustion from the multiple combustion chambers through the outlet of the casing.

2. The method of claim 1 further comprising providing the multiple combustion chambers in a rotor rotatably mounted in a cylindrical chamber of the casing, and adding the coal, air and fuel to the multiple combustion chambers for burning therein.

3. The method of claim 2 wherein the burning creates the products of combustion, and the method further comprising the exhausting the products of combustion from the multiple combustion chambers to impart rotation to the rotor within the casing, thereby converting thermal energy from combustion to mechanical energy; and without the use of moving parts in the multiple combustion chambers.

4. The method of claim 3 wherein the burning and the exhausting steps are accomplished without cams, valves and pistons.

5. The method of claim 2 wherein the burning step is started with a flame front and interaction of the charges with high pressure and high temperature products of combustion.

6. The method of claim 2 further comprising maintaining a fixed volume of the combustion chambers.

7. The engine of claim 2 wherein the casing and the rotor are free from cams and valves.

8. The method of claim 2 wherein the burning step includes sets of constant volume combustion and constant pressure combustion expansion in the same combustion chamber.

9. The method of claim 2 wherein the burning step is started with an interaction of the air and fuel mixture with high pressure and high temperature products of combustion to generate secondary ignition starting points in the multiple combustion chambers.

10. A method of combusting low Cetane number fuel by compression of an engine having a casing, a charge inlet, and an outlet, comprising:

providing a rotatable rotor with multiple combustion chambers in the casing of the engine;

infusing a mixture of air and the low Cetane number fuel into a porous material;

charging the mixture of air, the low Cetane number fuel and the porous material into the multiple combustion chambers through the charge inlet of the casing;

burning the mixture of air, the low Cetane number fuel and the porous material by compression of the engine; and exhausting products of combustion from the multiple combustion chambers through the outlet of the casing.

11. The method of claim 10 wherein the porous material is coal.

12. The method of claim 10 wherein the porous material is a synthetic porous material.

13. The method of claim 10 wherein the burning creates the products of combustion, and the method further comprising the exhausting the products of combustion from the multiple combustion chambers to impart rotation to the rotor within the casing, thereby converting thermal energy from combustion to mechanical energy; and without the use of moving parts in the multiple combustion chambers.

14. The method of claim 10 further comprising maintaining a fixed volume of the multiple combustion chambers.

15. The method of claim 10 wherein the casing and the rotor are free from cams and valves.

16. The method of claim 10 wherein the burning and exhausting steps are accomplished without cams, valves and pistons.

17. The method of claim 10 wherein the burning step includes sets of constant volume combustion and constant pressure combustion expansion in the same multiple combustion chambers.

18. The method of claim 10 wherein the burning step is started with an interaction of the air and fuel mixture with high pressure and high temperature products of combustion to generate secondary ignition starting points in the multiple combustion chambers.

* * * * *